US012698395B2

(12) United States Patent
Fini et al.

(10) Patent No.: US 12,698,395 B2
(45) Date of Patent: Aug. 4, 2026

(54) BIO-AGENT FOR EXTRACTION OF ASPHALTENE FROM SILICEOUS SURFACES

(71) Applicants: Elham Fini, Phoenix, AZ (US); Saba Shariati, Shenzhen (CN)

(72) Inventors: Elham Fini, Phoenix, AZ (US); Saba Shariati, Shenzhen (CN)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 592 days.

(21) Appl. No.: 18/084,992

(22) Filed: Dec. 20, 2022

(65) Prior Publication Data

US 2023/0193032 A1     Jun. 22, 2023

Related U.S. Application Data

(60) Provisional application No. 63/292,058, filed on Dec. 21, 2021.

(51) Int. Cl.
C08L 95/00          (2006.01)

(52) U.S. Cl.
CPC ........... C08L 95/00 (2013.01); *C08L 2555/34* (2013.01); *C08L 2555/64* (2013.01)

(58) Field of Classification Search
CPC ................................ C08L 95/00; C10C 3/007
See application file for complete search history.

(56) References Cited

U.S. PATENT DOCUMENTS

| | | | | |
|---|---|---|---|---|
| 2,288,857 | A | * | 7/1942 | Subkow .................. C09K 8/58 |
| | | | | 166/266 |
| 11,717,989 | B2 | | 8/2023 | Fini |
| 11,761,869 | B2 | | 9/2023 | Fini |
| 11,827,564 | B2 | | 11/2023 | Burton |
| 12,103,985 | B2 | | 10/2024 | Delgado |
| 12,110,397 | B2 | | 10/2024 | Seo |
| 2011/0294927 | A1 | * | 12/2011 | Williams ............... C08L 95/00 |
| | | | | 524/570 |
| 2019/0300427 | A1 | * | 10/2019 | Horton .................... C08L 95/00 |
| 2021/0147751 | A1 | * | 5/2021 | Fini ......................... C08L 95/00 |
| 2022/0204773 | A1 | | 6/2022 | Fini |
| 2022/0267211 | A1 | | 8/2022 | Fini |
| 2023/0062079 | A1 | | 3/2023 | Fini |

(Continued)

OTHER PUBLICATIONS

Hosseini et al. "Robust cleaning mechanism permanently detaches hydrocarbon species from silicate surfaces by amphiphiles" Applied Surface Science (2021) (Year: 2021).*

(Continued)

*Primary Examiner* — Alexandra M Moore
(74) *Attorney, Agent, or Firm* — Fish & Richardson P.C.

(57)          ABSTRACT

Treating aged asphalt includes contacting aged asphalt with a bioagent to yield a mixture. The aged asphalt includes a siliceous stone component and bitumen, and the bioagent includes bio-oils formed from hybrid biomasses. The siliceous stone component and the bitumen are separated. The bioagent promotes separation of the siliceous stone from the bitumen. A rejuvenated bitumen composition includes recycled bitumen, virgin bitumen, and a bioagent. The recycled bitumen can be produced from recycled asphalt paving, and the bioagent can include bio-oils formed from hybrid biomasses.

13 Claims, 31 Drawing Sheets

(56)　　　　　References Cited

U.S. PATENT DOCUMENTS

2023/0159390 A1　5/2023　Fini
2023/0193033 A1　6/2023　Fini
2023/0219846 A1　7/2023　Fini
2023/0227693 A1　7/2023　Fini
2023/0242820 A1　8/2023　Fini
2023/0294995 A1　9/2023　Fini
2023/0303804 A1　9/2023　Fini
2023/0323128 A1　10/2023　Fini
2023/0374310 A1　11/2023　Fini
2024/0084110 A1　3/2024　Fini
2024/0228783 A1　7/2024　Fini
2024/0270645 A1　8/2024　Fini
2024/0301175 A1　9/2024　Fini
2024/0360313 A1　10/2024　Fini
2024/0367148 A1　11/2024　Fini

OTHER PUBLICATIONS

Rajib and Fini. "Inherently Functionalized Carbon from Lipid and Protein-Rich biomass to reduce ultraviolet-Induced Damages in Bituminous Materials" ACS Omega 2020, 5, 25273-25820 (Year: 2020).*

Astm, D. "Standard test method for effect of heat and air on a moving film of asphalt (rolling thin-film oven test)." USA: Annual Book of ASTM Standards (2012), 6 pages.

Astm, "Standard Practice for Accelerated Aging of Asphalt Binder Using a Pressurized Aging Vessel (PAV)," 6 pages, 2013.

Astm D7175-05. Standard Test Method for Determining the Rheological Properties of Asphalt Binder Using a Dynamic Shear Rheometer. In Annual Book of ASTM Standards; ASTM International: West Conshohocken, PA, 2017; vol. 04.03, 16 pages.

Bai, Yun, et al. "Effects of the N, O, and S heteroatoms on the adsorption and desorption of asphaltenes on silica surface: A molecular dynamics simulation." Fuel 240 (2019): 252-261.

Bowers, Benjamin F., et al. "Investigation of reclaimed asphalt pavement blending efficiency through GPC and FTIR." Construction and building materials 50 (2014): 517-523.

Campen, Sophie, et al. "Deposition of asphaltene from destabilized dispersions in heptane-toluene." Energy & Fuels 32.9 (2018): 9159-9171.

Campen, Sophie Margaret, et al. "Effect of aging on the removal of asphaltene deposits with aromatic solvent." Langmuir 35.37 (2019): 11995-12008.

Celauro, Clara, et al. "Production of innovative, recycled and high-performance asphalt for road pavements." Resources, Conservation and Recycling 54.6 (2010): 337-347.

Chaisoontornyotin, Wattana, et al. "Combined asphaltene aggregation and deposition investigation." Energy & Fuels 30.3 (2016): 1979-1986.

Clark, Stewart J., et al. "First principles methods using CASTEP." Zeitschrift für kristallographie-crystalline materials 220.5-6 (2005): 567-570.

Copeland, Audrey. Reclaimed asphalt pavement in asphalt mixtures: State of the practice. No. FHWA-HRT-11-021. United States. Federal Highway Administration. Office of Research, Development, and Technology, 2011, 60 pages.

Delley, Bernard. "From molecules to solids with the DMol 3 approach." The Journal of chemical physics 113.18 (2000): 7756-7764.

Dickie, John P., et al. "Macrostructures of the asphaltic fractions by various instrumental methods." Analytical chemistry 39.14 (1967): 1847-1852.

Filley, Christopher M., et al. "The effects of toluene on the central nervous system." Journal of Neuropathology & Experimental Neurology 63.1 (2004): 1-12.

Fini, Elham H., et al. "Moisture damage and its relation to surface adsorption/desorption of rejuvenators." Industrial & Engineering Chemistry Research 59.30 (2020): 13414-13419.

Fini, Elham, et al. "Role of chemical composition of recycling agents in their interactions with oxidized asphaltene molecules." Journal of Materials in Civil Engineering 32.9 (2020): 04020268, 13 pages.

Gabrienko, Anton A., et al. "Chemical visualization of asphaltenes aggregation processes studied in situ with ATR-FTIR spectroscopic imaging and NMR imaging." The Journal of Physical Chemistry C 119.5 (2015): 2646-2660.

Ghamartale, Ali, et al. "New molecular insights into aggregation of pure and mixed asphaltenes in the presence of n-octylphenol inhibitor." Energy & Fuels 34.10 (2020): 13186-13207.

Grimme, Stefan. "Density functional theory with London dispersion corrections." Wiley Interdisciplinary Reviews: Computational Molecular Science 1.2 (2011): 211-228.

Hettiarachchi, Chamod, et al. "A blending efficiency model for virgin and aged binders in recycled asphalt mixtures based on blending temperature and duration." Resources, Conservation and Recycling 161 (2020): 104957, 12 pages.

Hosseini, Ehsan, et al. "Tunable, multifunctional ceramic composites via intercalation of fused graphene boron nitride nanosheets." ACS applied materials & interfaces 11.8 (2019): 8635-8644.

Hosseini, Ehsan, et al. "Graphene oxide in ceramic-based layered structure: Nanosheet optimization." Construction and Building Materials 224 (2019): 266-275.

Hosseini, Ehsan, et al. "Orbital overlapping through induction bonding overcomes the intrinsic delamination of 3D-printed cementitious binders." ACS nano 14.8 (2020): 9466-9477.

Hosseini, Ehsan, et al. "Robust cleaning mechanism permanently detaches hydrocarbon species from silicate surfaces by amphiphiles." Applied Surface Science 558 (2021): 149954, 9 pages.

Hou, Xiangdao, et al. "Identification of asphalt aging characterization by spectrophotometry technique." Fuel 226 (2018): 230-239.

Huang, Baoshan, et al. "Laboratory investigation of mixing hot-mix asphalt with reclaimed asphalt pavement." Transportation Research Record 1929.1 (2005): 37-45.

Hung, Albert M., et al. "Absorption spectroscopy to determine the extent and mechanisms of aging in bitumen and asphaltenes." Fuel 242 (2019): 408-415.

Hung, Albert M., et al. "Preventing assembly and crystallization of alkane acids at the silica-bitumen interface to enhance interfacial resistance to moisture damage." Industrial & Engineering Chemistry Research 58.47 (2019): 21542-21552.

Kabirb, Sk Faisal, et al. "Effects of amide-based modifiers on surface activation and devulcanization of rubber." Computational Materials Science 188 (2021): 110175, 9 pages.

Kuang, Jun, et al. "Evaluation of solvents for in-situ asphaltene deposition remediation." Fuel 241 (2019): 1076-1084.

Lemarchand, Claire A., et al. "Cooee bitumen: Chemical aging." The Journal of chemical physics 139.12 (2013). 36 pages.

Leontaritis, Kosta J. "Asphaltene near-well-bore formation damage modeling." Journal of Energy and Technology (2005): 191-200.

Li, Derek D., and Michael L. Greenfield. "Chemical compositions of improved model asphalt systems for molecular simulations." Fuel 115 (2014): 347-356.

Martín-Martínez, Francisco J., et al. "Molecular asphaltene models based on Clar sextet theory." Rsc Advances 5.1 (2015): 753-759.

Mousavi, Masoumeh, et al. "Multiscale investigation of oxidative aging in biomodified asphalt binder." The Journal of Physical Chemistry C 120.31 (2016): 17224-17233.

Mullins, Oliver C. "The modified Yen model." Energy & Fuels 24.4 (2010): 2179-2207.

Navarathna, Chanaka M., et al. "Biochar adsorbents with enhanced hydrophobicity for oil spill removal." ACS applied materials & interfaces 12.8 (2020): 9248-9260.

Oldham, Daniel, et al. "Investigating change of polydispersity and rheology of crude oil and bitumen due to asphaltene oxidation." Energy & Fuels 34.8 (2020): 10299-10305.

Oldham, Daniel J., et al. "A bottom-up approach to study the moisture susceptibility of bio-modified asphalt." Construction and Building Materials 265 (2020): 120289. 10 pages.

Oldham, Daniel, et al. "Transesterification of waste cooking oil to produce a sustainable rejuvenator for aged asphalt." Resources, Conservation and Recycling 168 (2021): 105297. 8 pages.

(56)     References Cited

OTHER PUBLICATIONS

Oldham, Daniel, et al. "Reducing susceptibility to moisture damage in asphalt pavements using polyethylene terephthalate and sodium montmorillonite clay." Construction and Building Materials 269 (2021): 121302. 12 pages.

Östlund, Jenny-Ann, et al. "Characterization of fractionated asphaltenes by UV-vis and NMR self-diffusion spectroscopy." Journal of colloid and interface science 271.2 (2004): 372-380.

Pahlavan, Farideh, et al. "Investigation of balanced feedstocks of lipids and proteins to synthesize highly effective rejuvenators for oxidized asphalt." ACS Sustainable Chemistry & Engineering 8.20 (2020): 7656-7667.

Payne, M.C., et al. "Iterative minimization techniques for ab initio total-energy calculations: molecular dynamics and conjugate gradients." Reviews of modern physics 64.4 (1992): 1045-1097.

Perdew, John P., Kieron Burke, and Matthias Ernzerhof. "Generalized gradient approximation made simple." Physical review letters 77.18 (1996): 3865-3868.

Petersen, J. Claine, et al. "Asphalt aging: dual oxidation mechanism and its interrelationships with asphalt composition and oxidative age hardening." Transportation Research Record 1638.1 (1998): 47-55.

Rajib, Amirul Islam, et al. "Investigating molecular-level factors that affect the durability of restored aged asphalt binder." Journal of cleaner production 270 (2020): 122501. 11 pages.

Rajib, Amirul I., et al. "Do all rejuvenators improve asphalt performance?." Road Materials and Pavement Design 23.2 (2022): 358-376.

Rajib, Amirul Islam, Saba Shariati, and Elham H. Fini. "The effect of progressive aging on the bond strength of bitumen to siliceous stones." Applied Surface Science 550 (2021): 149324, pp. 1-9.

Schuler, Bruno, et al. "Unraveling the molecular structures of asphaltenes by atomic force microscopy." Journal of the American Chemical Society 137.31 (2015): 9870-9876.

Schutte, Koen CJ, et al. "Hydrodynamic perspective on asphaltene agglomeration and deposition." Energy & Fuels 29.5 (2015): 2754-2767.

Shamsaei, Ezzatollah, et al. "Zeolitic imidazolate framework nanoleaves (ZIF-L) enhancement of strength and durability of portland cement composites." Construction and Building Materials 272 (2021): 122015, 11 pages.

Shariati, Saba, et al. "A multifunctional bio-agent for extraction of aged bitumen from siliceous surfaces." Journal of Industrial and Engineering Chemistry 104 (2021): 500-513.

Shariati, Saba, et al. "Interaction mechanisms of polyphosphoric acid and nano clay in bituminous composites." Journal of Colloid and Interface Science 588 (2021): 446-455.

Shirodkar, Prashant, et al. "A study to determine the degree of partial blending of reclaimed asphalt pavement (RAP) binder for high RAP hot mix asphalt." Construction and Building Materials 25.1 (2011): 150-155.

Silva, Hugo MRD, et al. "Are totally recycled hot mix asphalts a sustainable alternative for road paving?." Resources, Conservation and Recycling 60 (2012): 38-48.

Tirjoo, A.; Bayati, B.; Rezaei, H.; Rahmati, M. Molecular dynamics simulations of asphaltene aggregation under different conditions. Journal of Petroleum Science and Engineering 2019, 177, 392-402, DOI: https://doi.org/10.1016/j.petrol.2019.02.041.

Xu, Meng, et al. "Analysis of adhesive characteristics of asphalt based on atomic force microscopy and molecular dynamics simulation." ACS applied materials & interfaces 8.19 (2016): 12393-12403.

Xu, Ying, et al. "Effect of blending degree between virgin and aged binder on pavement performance of recycled asphalt mixture with high RAP content." Advances in Materials Science and Engineering 2019 (2019): 1-15.

Yang, Zheng, et al. "Binary solvents with ethanol for effective bitumen displacement at solvent/mineral interfaces." Energy & Fuels 29.7 (2015): 4222-4226.

Yang, Bingqing, et al. "Extraction of oil from oil sands using thermoresponsive polymeric surfactants." ACS Applied Materials & Interfaces 7.10 (2015): 5879-5889.

Zadshir, Mehdi, et al. "Deagglomeration of oxidized asphaltenes as a measure of true rejuvenation for severely aged asphalt binder." Construction and building materials 209 (2019): 416-424.

Zhang, Ran, et al. "The impact of bio-oil as rejuvenator for aged asphalt binder." Construction and building materials 196 (2019): 134-143.

Petersen, J. C.; Glaser, R., Asphalt Oxidation Mechanisms and the Role of Oxidation Products on Age Hardening Revisited. Road Materials and Pavement Design 2011, 12 (4), 795-819.

Pernyeszi, Timea, et al. "Sorption and elution of asphaltenes from porous silica surfaces." Colloids and Surfaces A: Physicochemical and Engineering Aspects 194.1-3 (2001): 25-39.

Fini, A.M. Hung, A. Roy, Active Mineral Fillers Arrest Migrations of Alkane Acids to the Interface of Bitumen and Siliceous Surfaces, ACS Sustainable Chem. Eng. 7 (12) (2019) 10340-10348, https://doi.org/10.1021.

Zaumanis, Martins, et al. "100% recycled hot mix asphalt: A review and analysis." Resources, Conservation and Recycling 92 (2014): 230-245.

* cited by examiner

2) HY peptizing role

4) Bridged HY ensures durability

1) Introduction of HY

3) HY desorbing role

Phenols
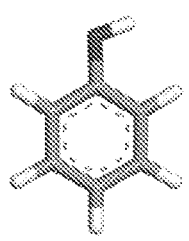 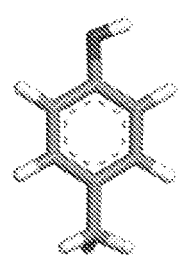
Phenol                       p-Cresol
FIG. 2A
Heterocyclic compounds
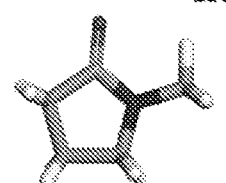 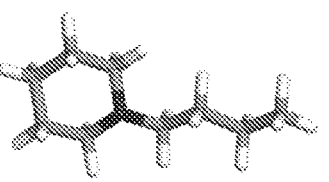
N-methyl-2-Pyrrolidone         1-butyl-Piperidine
FIG. 2B
Aliphatics with oxygen and nitrogen contents
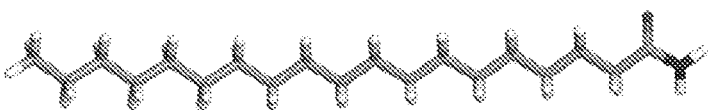
Nonadecanamide
FIG. 2C
N-methyl-Myristamide
Aromatic/fused aromatics with nitrogen content
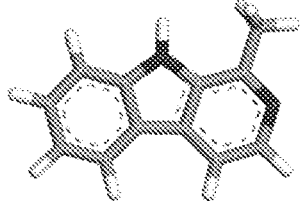 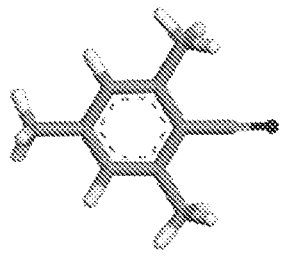
1-methyl-9H-Pyrido[3,4-b] indole        Mesitonitrile
(Harmane)
FIG. 2D

$E_{int} = -27.1$ kcal/mol $E_{int} = -26.1$ kcal/mol $E_{int} = -33.8$ kcal/mol $E_{int} = -53.6$ kcal/mol $E_{int} = -37.5$ kcal/mol $E_{int} = -142.4$ kcal/mol $E_{int} = -56.0$ kcal/mol $E_{int} = -68.3$ kcal/mol $E_{int} = -96.1$ kcal/mol $E_{int} = -107.4$ kcal/mol $E_{int} = -81.0$ kcal/mol $E_{int} = -96.0$ kcal/mol $E_{int} = -80.7 \text{ kcal/mol}$

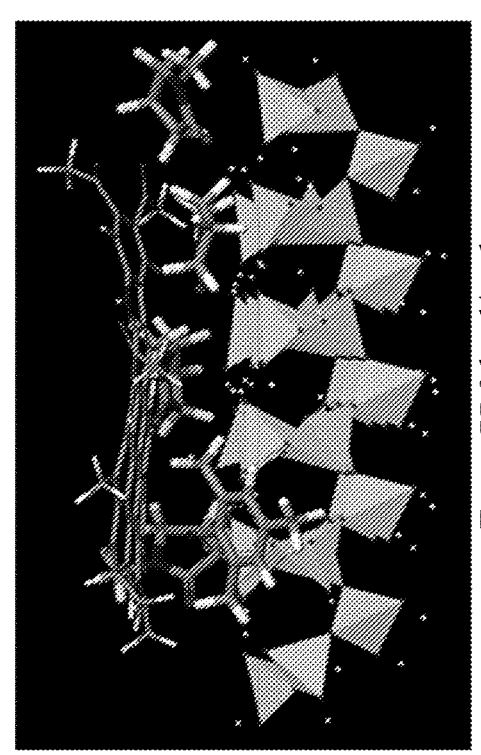
$E_{int} = -77.0$ kcal/mol
FIG. 9C
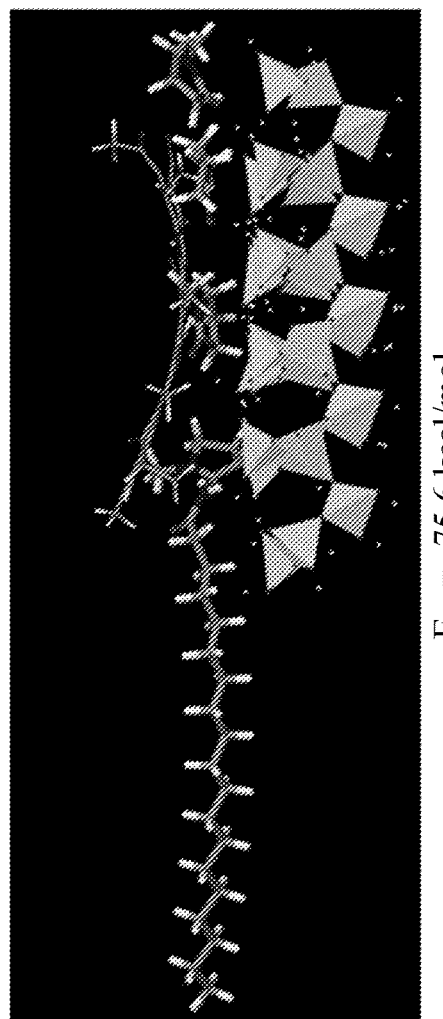
$E_{int} = -75.6$ kcal/mol
FIG. 9A
$E_{int} = -72.8$ kcal/mol
FIG. 9B $E_{int} = -80.2$ kcal/mol $E_{int} = -68.5$ kcal/mol $E_{int} = -63.4$ kcal/mol

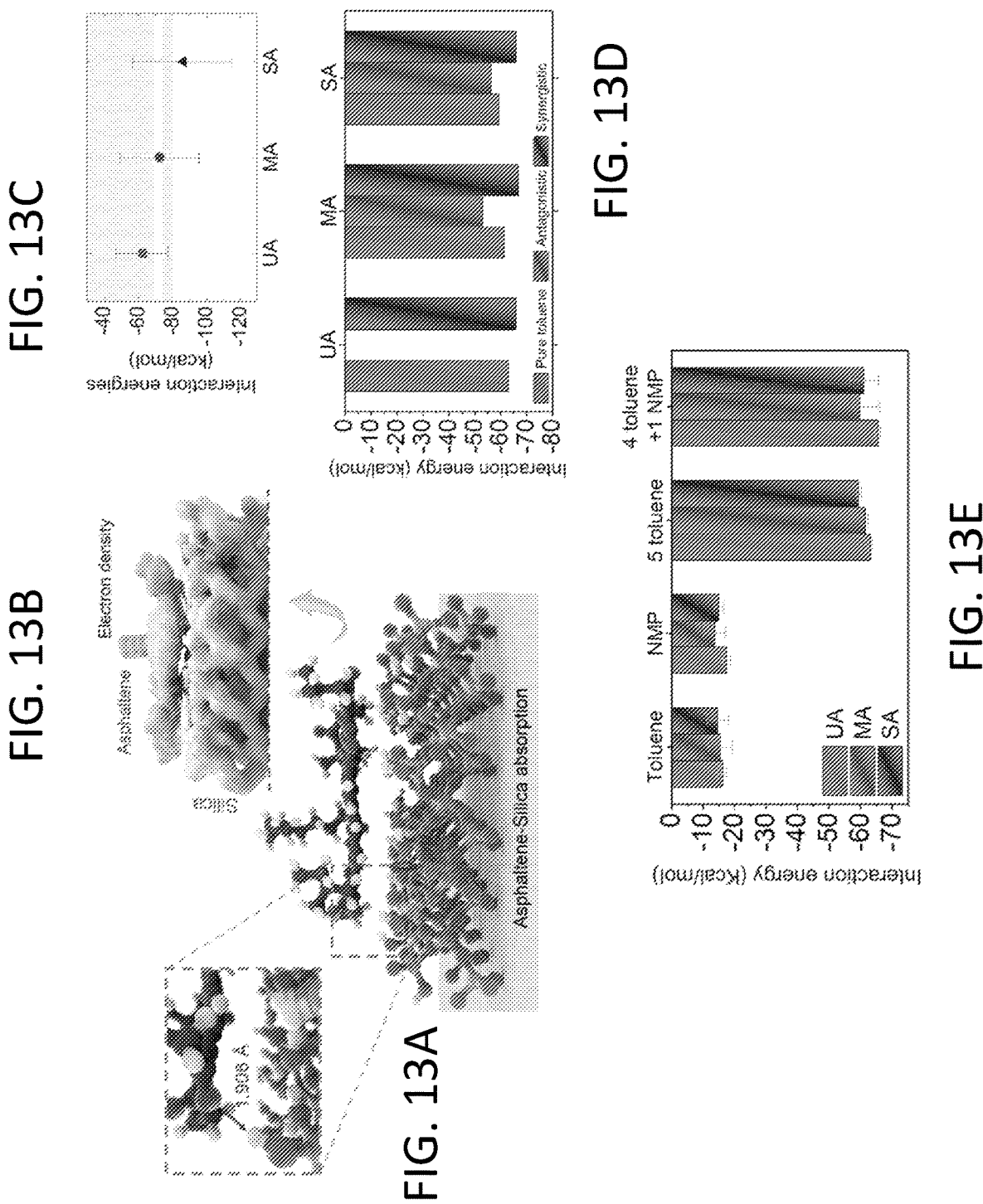

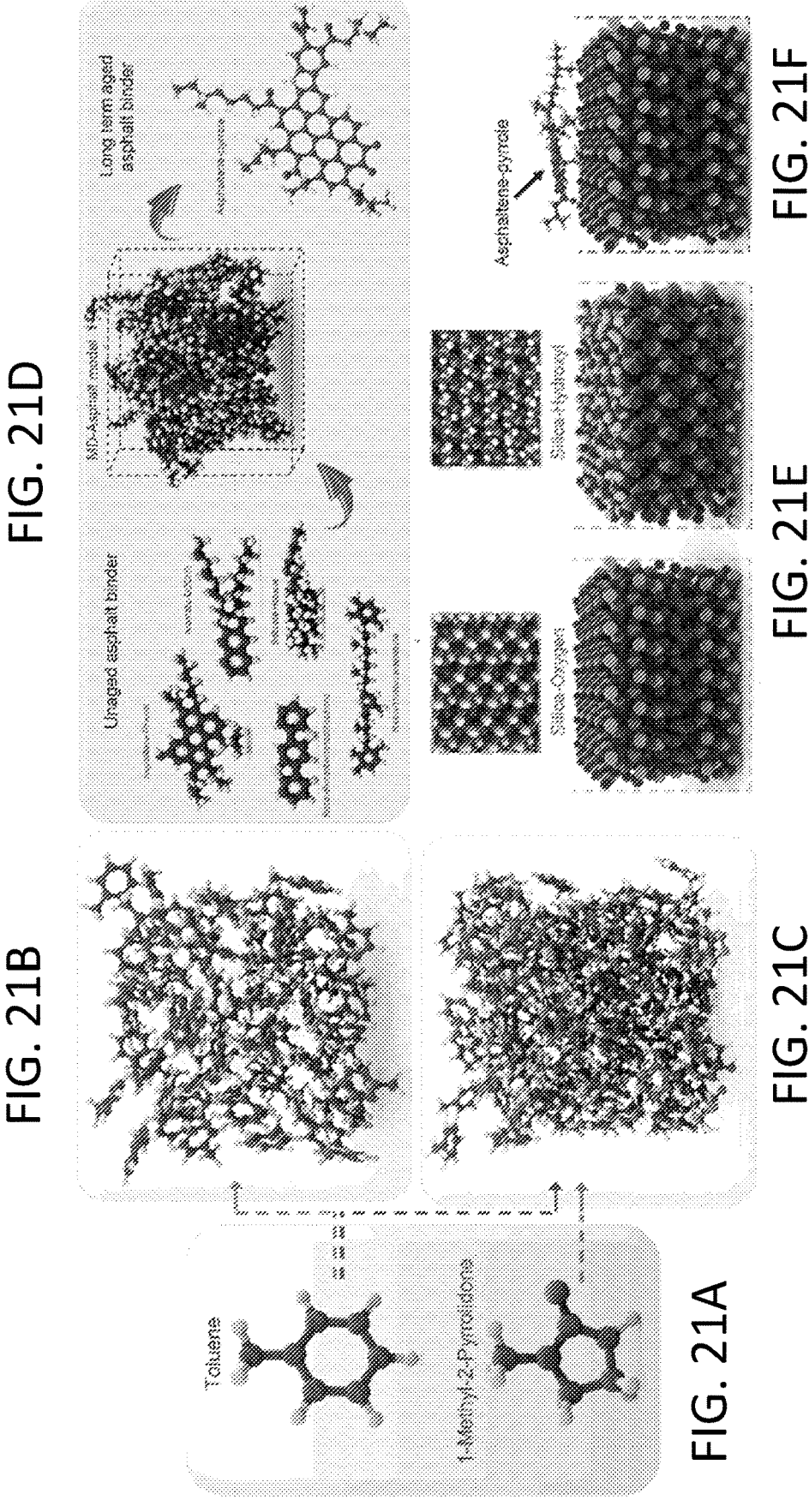

$E_{int}$ = -78.8 kcal/mol $E_{int}$ = -95.7.8 kcal/mol $E_{int}$ = -115.0 kcal/mol $E_{int(SA-silica)INMP} = -110.1$ kcal/mol $E_{int(SA-silica)} = -115.0$ kcal/mol $E_{int(SA\text{-}silica)2NMP} = -96.1$ kcal/mol $E_{int(SA\text{-}silica)3NMP} = -89.4$ kcal/mol $E_{int(SA\text{-}silica)4NMP} = -80.7$ kcal/mol $E_{int(MA\text{-}silica)} = -95.7$ kcal/mol $E_{int(MA\text{-}silica)1NMP} = -86.5$ kcal/mol

BIO-AGENT FOR EXTRACTION OF ASPHALTENE FROM SILICEOUS SURFACES

CROSS-REFERENCE TO RELATED APPLICATION

This application claims the benefit of U.S. Patent Application 63/292,058 filed on Dec. 21, 2021, which is incorporated herein by reference in its entirety.

STATEMENT OF GOVERNMENT SUPPORT

This invention was made with government support under National Science Foundation Award Number 1928807. The government has certain rights in the invention.

TECHNICAL FIELD

This invention relates to the use of sustainable and environmentally friendly bio-agents to clean deposited crude oil compounds (asphaltene) and recover and rejuvenate bitumen used in asphalt and other materials.

BACKGROUND

Bitumen is a substance produced through the distillation of crude oil that is known for its waterproofing and adhesive properties. Bitumen production through distillation removes lighter crude oil components, such as gasoline and diesel, leaving the "heavier" bitumen behind. The bitumen is often refined several times to improve its grade. Bituminous composites are used to construct roads, runways, bridge decks, and roofs. Asphaltene is the name given to a dense and polar section of crude oil. Asphaltene deposits and agglomeration can reduce the capacity of pipes and other facilities in petroleum production lines and cause temporary or permanent closure of oil wells.

SUMMARY

This disclosure describes the use of sustainable and eco-friendly bioagents to maximize the recovery of oil-based materials, including separation and rejuvenation of bitumen from aged asphalt. The bioagent is a mixture of bio-oils formed from the liquefaction of sustainable swine manure and protein-rich algae. The bioagent facilitates separation of the aged bitumen in reclaimed asphalt from siliceous stones, and peptizes and rejuvenates the bitumen for reuse. The recovered (revitalized) bitumen can be recycled and used in the production of new asphalt.

The bioagent can be used as a pure solvent or mixed with other organic solvents such as toluene and xylene to reduce the toxicity of solvents in different industries. The bioagent is typically derived from hydrothermal liquefaction of mixed biomasses. The resulting bioagent contains suitable functional groups in its molecular components that can disrupt the hydrocarbon-siliceous stone interfacial bonds, and can eliminate the aging affects in hydrocarbons while provide more durability and water-resistance for the system. The first role occurs due at least in part to a mechanism that includes attack of polar sites of bioagent to polar sites of silica and retreat of hydrocarbons from silica. A second role occurs due at least in part to a "peptizing" mechanism, and a third role is achieved due to "bridging role" of the bioagent that provides a water-resistant layer.

In a first general aspect, treating aged asphalt includes contacting aged asphalt with a bioagent to yield a mixture. The aged asphalt includes a siliceous stone component and bitumen, and the bioagent includes bio-oils formed from hybrid biomasses. The siliceous stone component and the bitumen are separated. The bioagent promotes separation of the siliceous stone from the bitumen.

Implementations of the first general aspect can include one or more of the following features.

The bioagent can peptize and rejuvenate the bitumen. In some cases, the first general aspect further includes combining the bitumen with additional bitumen to yield a revitalized bitumen. In some implementations, the first general aspect further includes combining the revitalized bitumen with aggregate to yield asphalt. The bioagent can form a water-resistant bridge between the siliceous stone and the bitumen, thereby enhancing water-damage resistance of the revitalized bitumen. In some cases, the bioagent includes one or more of p-cresol, phenol, N-methyl-2-pyrrolidone, 1-methyl-9H-pyrido[3,4-b] indole, N-methyl-myristamide, nonadecanamide, 1-butyl-piperidine, and mesitonitrile. In some implementations, the bioagent includes specific functional groups including polar oxygen and nitrogen heteroatoms. The bioagent can be produced from a mixture including about 10 wt % to about 30 wt % of swine manure and about 70 wt % to about 90 wt % of algae. In some cases, the mixture includes about 5 wt % to about 15 wt % of the bioagent and about 85 wt % to about 95 wt % of the asphalt. In some implementations, separating the siliceous stone component from the bitumen includes washing the bitumen from a surface of the siliceous stone. The bioagent can include one or more of phenol compounds, heterocyclic compounds, aliphatic compounds including oxygen and nitrogen, aromatic compounds including nitrogen, and fused aromatic compounds including nitrogen. In some cases, the first general aspect further includes forming the bioagent by hydrothermal liquefaction of biomass. In some implementations, the first general aspect further includes forming the bioagent from waste cooking oil.

In a second general aspect, a rejuvenated bitumen composition includes recycled bitumen, virgin bitumen, and a bioagent. The recycled bitumen can be produced from recycled asphalt paving, and the bioagent can include bio-oils formed from hybrid biomasses.

Implementations of the second general aspect can include one or more of the following features.

The bioagent can include one or more of phenol compounds, heterocyclic compounds, aliphatic compounds including oxygen and nitrogen, aromatic compounds including nitrogen, and fused aromatic compounds including nitrogen. In some cases, the bioagent includes one or more of p-cresol, phenol, N-methyl-2-pyrrolidone, 1-methyl-9H-pyrido[3,4-b] indole, N-methyl-myristamide, nonadecanamide, 1-butyl-piperidine, and mesitonitrile. In some implementations, the bioagent includes specific functional groups including polar oxygen and nitrogen heteroatoms. The hybrid biomass can include about 10 wt % to about 30 wt % of swine manure and about 70 wt % to about 90 wt % of algae. In some cases, the bio-oils include waste cooking oil. An asphalt composition can include the second general aspect and aggregate.

Advantages of methods described herein include the reduction or elimination of toxic solvents used in conventional asphalt recycling technologies and enhanced water-damage resistance in the recycled and rejuvenated bitumen compared with conventionally recycled material.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIGS. 2A-2D illustrate the HY molecules described in this disclosure.

FIG. 5A shows p-Cresol. FIG. 5B shows phenol. FIG. 5C shows N-methyl-2-pyrrolidone (NMP). FIG. 5D shows 1-methyl-9H-pyrido[3,4-b] indole (harmane). FIG. 5E shows mesitonitrile. FIG. 5F shows 1-butyl-piperidine. FIG. 5G shows nonadecanamide. FIG. 5H shows N-methyl-myristamide.

FIGS. 9A-9F illustrate the reduction in energy of asphaltene(S)-silica adhesion within the system including asphaltene(S)-silica and four N-methyl-2-pyrrolidone) and after adding: nonadecanamide molecule; harmane molecule; mesitonitrile molecule; p-cresol molecule; harmane and nonadecanamide molecules; and harmane and 1-butyl-piperidine molecules, respectively.

FIG. 13A shows asphaltene closed on the silica surface, with one of the O(asphaltene)-H(silica) marked shown in the expanded view. FIG. 13B shows the electron density of the asphaltene-silica. FIG. 13C shows the density functional theory (DFT) results for interaction energies between silica and the three types of modeled asphaltene. FIG. 13D illustrates the interactions of asphaltenes with pure and hybrid solvents. The hybrid is situated in two situations with the most and the least interaction energies marked with synergistic and antagonistic, respectively. FIG. 13E displays the interaction energies between three models of asphaltene and four combinations of toluene and NMP.

FIG. 16A illustrates asphaltene in the presence of cleaner (NMP) and silica, with the O(cleaner)-H(Silica) marked; FIG. 16B illustrates the electron density of the asphaltene-cleaning material-silica ternary system.

FIG. 21A shows toluene and NMP molecules. FIGS. 21B and 21C show a calculated toluene solvent cell and a toluene-NMP solvent cell, respectively. FIG. 21D shows the components of the asphaltene model, shown beside the aged asphaltene. FIG. 21E shows two models of silica, one covered by O, the other by OH. FIG. 21F depicts asphaltene-pyrrole interacting with the silica surface.

DETAILED DESCRIPTION

Aging affects the quality of bitumen. In particular, oxidative aging increases the asphaltene content of bitumen and introduces more polar functional groups such as carbonyl and sulfoxide to a bitumen composite. The consequences in aged bitumen include increased agglomeration of asphaltenes and an imbalance in saturates, aromatics, resins, and asphaltenes (SARA) fractions. In addition to intermolecular interactions between the components of bitumen, bitumen-aggregate interactions are also affected by aging. Asphaltenes, the polyaromatic bitumen molecules with both polar and non-polar sites, have high affinity toward the solid substrates. Consequently, asphaltenes form deposits on aggregates, especially on siliceous aggregates. In terms of bonding to stones, aging promotes bitumen-aggregate interactions.

When deposits with a high content of oxidized asphaltenes and oxidized polar aromatics form on aggregates during aging, this negatively affects recycling of the asphalt pavement. Although strong bitumen-aggregate adhesion is a positive factor in a virgin asphalt mixture, those strongly bonded aged deposits on stones in recycled asphalt pavement (RAP) make it more difficult to have a qualified re-mixture of virgin and reclaimed bitumen with balanced molecular fractions and promising properties. Residuals of oxidized bitumen can be separated from the stones and re-blended in a mixture to provide a more homogenous and rebalanced composite. One factor in bitumen recycling is the degree of blending, defined as the proportion of RAP bitumen that can effectively be blended with virgin bitumen. Improving the blending efficiency of virgin bitumen and RAP bitumen improves the durability of the resulting recycled bitumen as measured by low-temperature performance, resistance to moisture damage, and resistance to fatigue. Controlling the homogeneity of recycled materials results in a high-performance pavement with a high content of reclaimed materials.

Figures 1A, 1B, 1C, 1D:
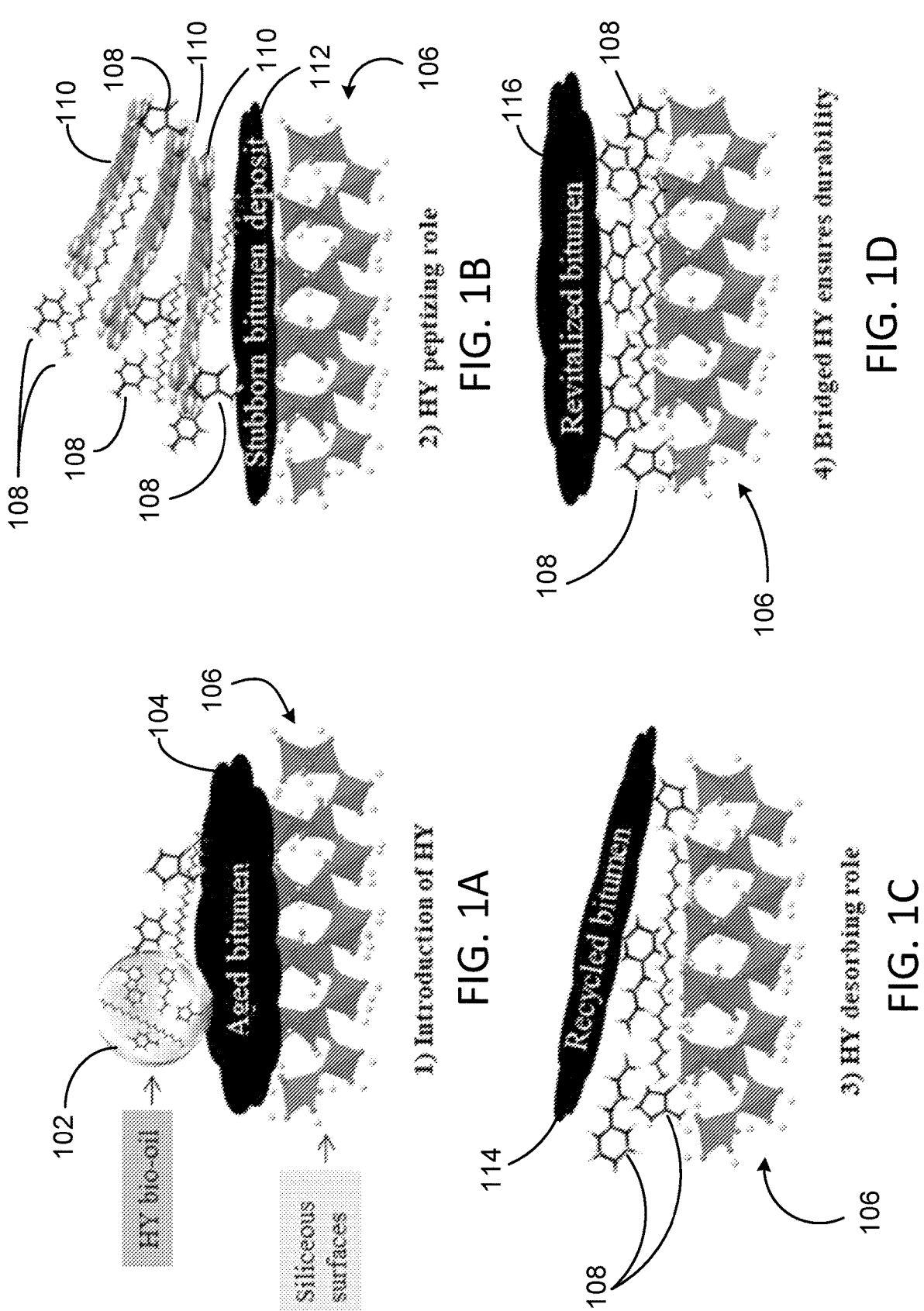
FIGS. 1A-1D are schematics depicting the multifunctional roles of hybrid bio-oils (HY) in asphalt recycling.

FIGS. 1A-1D depict the multifunctional roles for bio-agents including hybrid bio-oils (HY) in recycling and revitalizing bitumen. In FIG. 1A, a bioagent including a selected blend of bio-oils 102 formed from hybrid biomasses is mixed with aged bitumen 104 that is strongly bonded to a siliceous surface 106. Examples of a siliceous surface 106 include the surface of stone aggregates. The bioagent can include specific functional groups including polar oxygen and nitrogen heteroatoms. The bioagent can include one or more of phenol compounds, heterocyclic compounds, aliphatic compounds including oxygen and nitrogen, aromatic compounds including nitrogen, and fused aromatic compounds including nitrogen. The bioagent can include one or more of p-cresol, phenol, N-methyl-2-pyrrolidone, 1-methyl-9H-pyrido[3,4-b] indole, N-methyl-myristamide, nonadecanamide, 1-butyl-piperidine, and mesitonitrile. The bioagent can be produced from a mixture including about 10 wt % to about 30 wt % of swine manure and about 70 wt % to about 90 wt % of algae. The bio-oils can include waste cooking oil.

FIG. 1B depicts molecules 108 of the bioagent diminishing and disrupting the intermolecular attractive forces between asphaltene molecules 110. The molecules 108 of the bioagent intercalate between the adsorbed asphaltene agglomerations, dissolving and dispersing the asphaltene molecules 110 in a peptizing mechanism that facilitates the separation of the bitumen 112 and siliceous stone component.

FIG. 1C depicts molecules 108 of the bioagent adsorbed to siliceous surface 106 that replace asphaltene molecules and results in the desorption of bitumen deposits 114. Thus the application of bio-oils can be implemented where a solvent/desorbent is needed to alter the adhesion between hydrocarbons and a siliceous surface 106.

FIG. 1D depicts the affinity that molecules 108 of the bioagent have toward both siliceous surface 106 and bitumen 116. The molecules 108 of the bioagent can act as a bridge between the siliceous surface 106 and bitumen 116 in a newly revitalized bituminous mixture. The replacement of asphaltenes with molecules 108 of the bioagent on the siliceous surface 106 can be highly beneficial for the durability of bituminous composites when exposed to water. The bioagent can form a water-resistant bridge between the siliceous stone and the bitumen, thereby enhancing water-damage resistance of the revitalized bitumen. The revitalized bitumen can be combined with aggregate to yield asphalt. The mixture can include about 5 wt % to about 15 wt % of the bioagent and about 85 wt % to about 95 wt % of the asphalt. A rejuvenated bitumen composition can include recycled bitumen, virgin bitumen, and a bioagent. The recycled bitumen can be produced from recycled asphalt paving, and the bioagent can include bio-oils formed from hybrid biomasses. The role of a hybrid biorejuvenator (a blend of lipid-rich swine-manure bio-oil and protein-rich algae bio-oil) to mitigate the aging effects arising from the excessive deposits of oxidized bitumen on siliceous surface of aggregates is assessed by analytical methods using a dynamic shear rheometer (DSR) and the moisture-induced shear-thinning index (MISTI) as well as density functional theory (DFT).

EXAMPLES

Materials. The base bitumen was graded PG 64-16 and was acquired from HollyFrontier in Arizona. The properties of the bitumen PG 64-16 are provided in Table 1. To age the base bitumen, each sample was initially aged using a rolling thin-film oven (RTFO) to simulate the aging of the bitumen in the production and installation of asphalt pavement. For all samples, the RTFO aging was followed by aging in a pressure aging vessel (PAV) at 105° C. The duration of aging in the PAV was adjusted to be 40 hours; the samples aged for this duration are referred to as "aged bitumen". The bio-oil rejuvenator is referred to as hybrid bio-oil and labeled as HY; it was produced from swine manure (20% by weight) and algae (80% by weight). To make rejuvenated samples, aged bitumen was heated at 135° C. for 30 minutes to ensure it was sufficiently liquid, and then HY rejuvenator was added to the aged bitumen at 10% by weight of bitumen and mixed by hand with a spatula for 5 minutes. The rejuvenated sample was labeled as "aged bitumen with HY". For moisture-induced shear-thinning test, the aged bitumen sample mixed with waste cooking oil (WCO) was used; although WCO is a rejuvenator for aged bitumen, it can increase the moisture susceptibility of bitumen. Here, the samples were labeled as "aged bitumen with WCO" and "aged bitumen with WCO and HY".

TABLE 1

| General properties of the PG 64-16 bitumen | |
|---|---|
| Specific Gravity @15.6° C. | 1.025 |
| Flashpoint ° C. | 300 |
| Absolute Viscosity, P | 2,005 |
| $G^*/\sin\delta$ @64° C., kPa | 1.23 |
| Mass change after RTFO | −0.210% |
| $G^*/\sin\delta$ @64° C., kPa | 3.33 |
| $G^*\sin\delta$ @28° C., kPa | 2.87 |
| Stiffness (MPa) @−6° C. @ 60 s | 90.4 |

Computational method and molecular modeling. For all interactions and adsorptions, non-periodic density functional theory (DFT) was used, and calculations were performed using the Dmol3 module implemented in the Accelrys Materials Studio program package (version 7). The Perdew-Burke-Ernzerhof (PBE) exchange-correlation functional including Grimme's dispersion correction (PBE-D) and an all-electron double-numerical polarized (DNP) basis set were used. The convergence criteria for optimizations were set to $2.0 \times 10^{-5}$ hartree, $4.0 \times 10^{-3}$ hartree/Å, and $5.0 \times 10^{-3}$ Å for energy, maximum force, and displacement, respectively. Interaction energies were calculated using Eq. 1

$$E_{int} = E_{complex} - (\Sigma E_{fragment}) \tag{1}$$

where $E_{complex}$ is the total energy of the interacting complex, and $E_{fragment}$ is the energy of an isolated fragment within the complex.

Herein, a silica cluster model was used that was built from a (001) basal silica surface. The latter surface itself was cleaved from the optimized $3 \times 3 \times 1$ supercell of $\alpha$-quartz. Asphaltenes of different ages named unaged (asphaltene (U)), moderately aged (asphaltene(M)), and severely aged (asphaltene(S)) were used. The asphaltene molecular model used is a medium-size continental-type conformer of asphaltenes. A modified Yen-Mullins molecular model which contains a pyrrole ring in its structure was used. Truncation was applied only on long side chains in order to have the proper size of asphaltene molecule to be adsorbed on a $3 \times 3 \times 1$ silica cluster model. The candidate HY molecules are shown in FIGS. 2A-2D. They have been categorized into four groups: phenols shown in FIG. 2A, heterocyclic compounds shown in FIG. 2B, aliphatics with oxygen and nitrogen shown in FIG. 2C, and aromatic/fused aromatics with nitrogen shown in FIG. 2D. These candidate HY molecules were selected based on their high percentage area in gas chromatography-mass spectroscopy (GC-MS).

Dynamic Shear Rheometer (DSR). An Anton Paar Modular Compact Rheometer MCR 302 was used to measure the elastic and viscous behavior of each sample (aged bitumen and rejuvenated bitumen) following ASTM D7175. The test was conducted at 0.1% strain rate and frequency ranging from 0.1 to 100 rad/s using an 8-mm parallel plate. The test was performed at a temperature of 25° C. From the measured data, the complex shear modulus (G*) and phase angle ($\delta$) were calculated using Eq. 2:

$$G^* = \frac{\tau_{max}}{\gamma_{max}} \tag{2}$$

in which:

$$\tau_{max} = \frac{2T}{\pi r^3};$$

$$\gamma_{max} = \left(\frac{\theta r}{h}\right);$$

$\gamma_{max}$=maximum strain; $\tau_{max}$=maximum stress; T=maximum applied torque; r=radius of the sample; $\theta$=deflection (rotational) angle; and h=height of the sample.

The corresponding results were used for elastic modulus (G') and viscous module (G"), also referred to as the in modulus and crossover frequency. It should be noted that the crossover frequency is the frequency at-phase (G') and out-of-phase (G") components of the complex shear modulus. The crossover at which the viscous modulus and the elastic modulus are equal was determined. The modulus at this point is called the crossover modulus and is a fundamental property of bitumen. The crossover modulus has been used as an indicator to track the extent of aging and rejuvenation.

Figure 3:
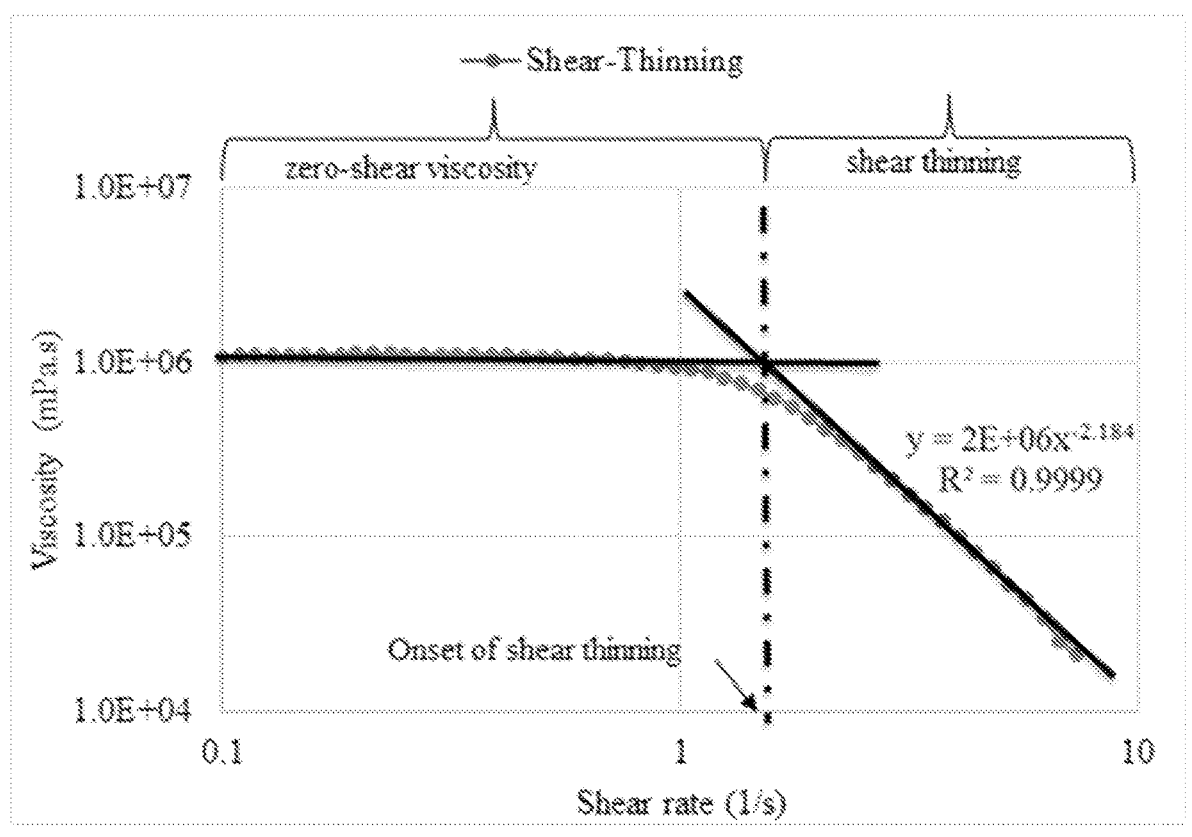
FIG. 3 shows the zero-shear viscosity (ZSV), shear-thinning, and the onset of shear thinning measurement from the graph of viscosity versus shear rate.

Moisture-Induced Shear-Thinning Index (MISTI). An Anton Paar Rheometer MCR 302 dynamic shear rheometer was used to measure the shear-thinning rate of all samples. To prepare samples for the MISTI test, bitumen was mixed with glass beads (representing siliceous stone) of 100 microns in diameter at a 1:2 weight ratio of glass beads to bitumen. Six specimens (0.3 g each) for each sample were prepared and cast in 8-mm silicon molds. Three samples were water conditioned for 24 hr at 60° C., while the other three samples were kept dry at room temperature. Each specimen was subjected to a shear sweep test (0.1 to 100 l/sec). The test was run at 80° C. and 64° C. for "aged bitumen with WCO and HY" and "aged bitumen with WCO", respectively. The test temperatures were selected to have similar viscosity values for all tested samples. The MISTI value was calculated using Eq. 3. Some parameters that can be obtained from the MISTI test are shown in FIG. 3. The shear thinning is a constant value (in this case 2.18), as it is the slope of the best-fit line at the shear-thinning region shown in FIG. 3.

$$MISTI = \frac{\text{Average slope(viscosity vs shear rate)of wet specimen}}{\text{Average slope (viscosity vs shear rate)of dry specimen}} \tag{3}$$

Figure 4:
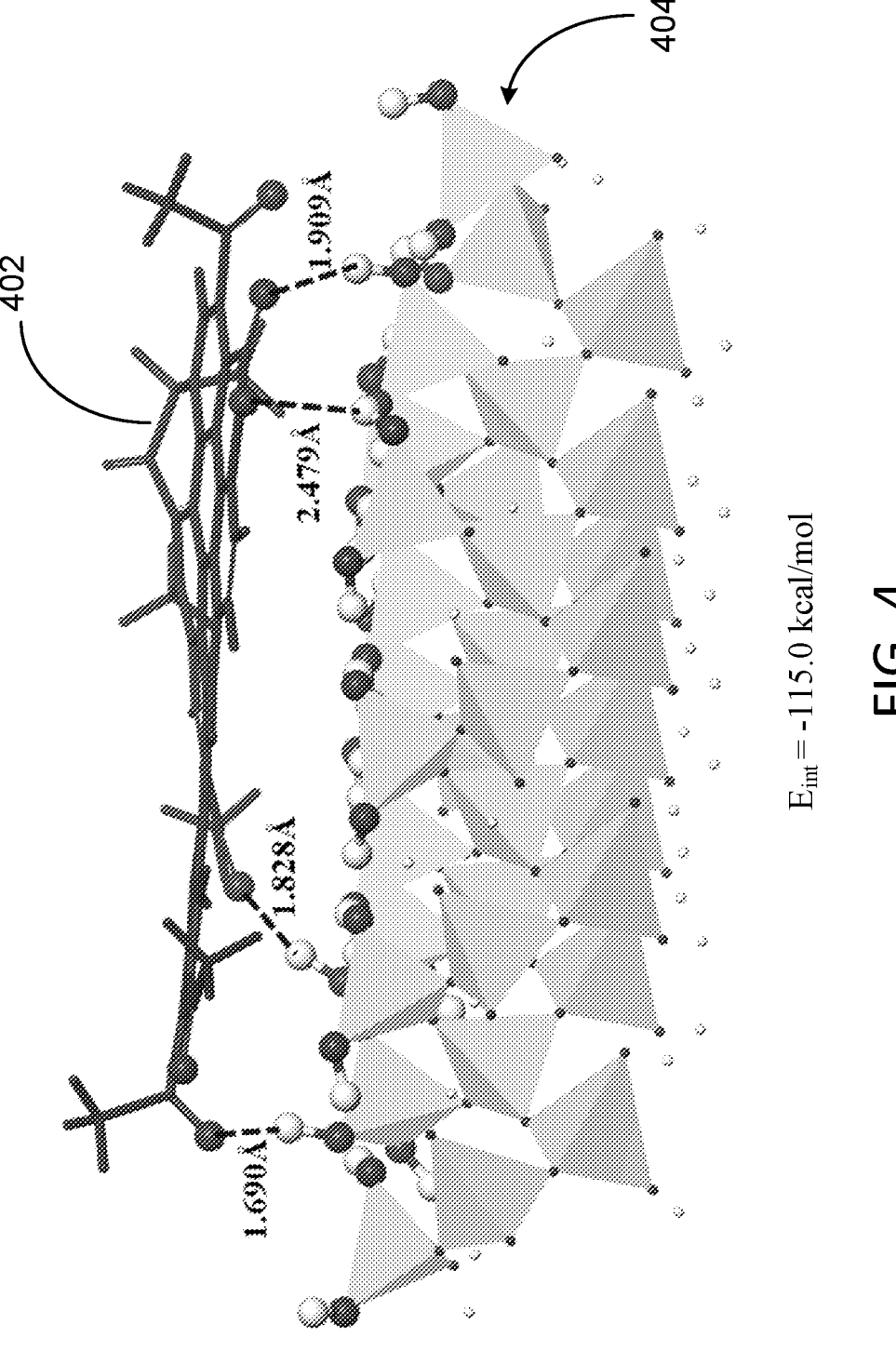
FIG. 4 illustrates the interaction between severely aged asphaltene and silica.

DFT-based computational results. When using a desorbent (D) to displace the pre-adsorbed species (PA) on a solid surface (S), two features for D are important: 1) D affinity toward the PA; and 2) D affinity toward S. A high affinity of D toward the PA means there would be a competition between D-PA and S-PA interactions. In this case, D molecules are able to interact with PA, dissolve them, and wash them out from the solid surface. A high affinity of D toward S results in a competition between D-S and PA-S interactions, leading to adsorption of D on S that replaces the PA on S. If the two abovementioned features are prepared, desorption and dispersion of PA particles will be facilitated. Based on these points the interactions of HY molecules with a silica cluster model were used to calculate and compare their affinity toward the silica. The interactions of HY molecules with asphaltene(U), asphaltene(M), and asphaltene(S) were also assessed to track their ability to dissolve asphaltene. Furthermore, changes in the interaction energies of the asphaltene-silica complex in the presence of some selected HY molecules were monitored. The asphaltene(S)-silica adsorption complex is shown in FIG. 4. Asphaltene(S) 402 formed the highest number of hydrogen bonds with silica 404, resulting in the strongest adsorption. Hydrogen bonds are shown with dashed lines in FIG. 4.

Adsorption of HY molecules on silica cluster. FIGS. 5A-5H show the optimized geometries for each of the HY-silica interactions. The figures are expanded views of the relevant interaction zones. The results are discussed below for each of the four categories of HY molecules shown in FIG. 2.

Phenols. Results showed that both p-cresol shown in FIG. 5A and phenol shown in FIG. 5B were adsorbed on silica by formation of hydrogen bonds. The more stable adsorption complexes were those in which a hydrogen bond was formed between the oxygen atom of phenols and the hydrogen atom of a silanol group of silica (SiOH): $(HO)_{phenol}$ . . . $(HO)_{silica}$. The interaction energies were −26.1 and −27.1 kcal/mol for phenol-silica and p-cresol-silica, respectively. The adsorption complexes with hydrogen bonds between the H atom of phenols and the O atom of a silanol group, $(OH)_{phenol}$ . . . $(OH)_{silica}$, were less stable; the interaction energies were −20.5 and −23.4 kcal/mol for phenol-silica and p-cresol-silica, respectively.

Heterocyclic compounds. High interaction energies were obtained for both N-methyl-2-pyrrolidone-silica (−33.8 kcal/mol) shown in FIG. 5C and 1-butyl-piperidine-silica (−142.4 kcal/mol) shown in FIG. 5F. N-methyl-2-pyrrolidone is a cyclic amide with a carbonyl group as well as nitrogen content. Results showed a hydrogen bond in the form of $C=O^{\delta-}$ . . . $^{+\delta}HO$ between the oxygen atom of N-methyl-2-pyrrolidone and the H atom of a silanol group. The high interaction energy for 1-butyl-piperidine-silica is due at least in part to an acid-base interaction. In the latter interaction, a proton transfer from an acidic hydrogen atom of silanol to the basic nitrogen atom of 1-butyl-piperidine was observed.

Aliphatics with oxygen and nitrogen contents. A long-chain primary amide (nonadecanamide) shown in FIG. 5G and a long-chain secondary amide N-methyl-myristamide shown in FIG. 5H are in this category. Notable interaction energies were obtained for adsorption of the both long-chain amides on a silica cluster, with higher interaction energy for nonadecanamide-silica (−68.3 kcal/mol) than for N-methyl-myristamide-silica (−56.0 kcal/mol). In the case of nonadecanamide, both oxygen and nitrogen atoms of an amide group formed hydrogen bonds with hydrogen atoms of silica. The hydrogen bond distances for $C=O^{\delta-}$ . . . $^{+\delta}HO$ and $H_2N^{\delta-}$ . . . $^{+\delta}HO$ were 1.845 Å and 1.977 Å, respectively. In the N-methyl-myristamide-silica complex, $H_2N^{\delta-}$ . . . $^{+\delta}HO$ hydrogen bond is missing. A hydrogen bond in the form of $C=O^{\delta-}$ . . . $^{+\delta}HO$ with distance of 1.621 Å and a weaker interaction in form of $HNH^{\delta+}$ . . . $^{-\delta}OH$ (2.838 Å) was obtained for this complex. In both amide-silica complexes, the long non-polar aliphatic tail was oriented parallel to the silica surface, providing more dispersion and electrostatic attractions between the two fragments.

Aromatic/fused aromatics with nitrogen content. Mesitonitrile shown in FIG. 5E has an aromatic ring with three electron-donating methyl groups and a CN substitution. This molecule formed a $CN^{\delta}$ . . . $^{+\delta}HO$ hydrogen bond (1.751 Å) with silica; the aromatic part with alkyl substitutions was oriented parallel to the silica surface, providing more attractions between the two fragments.

Figures 5A, 5B, 5C, 5D, 5E, 5F:
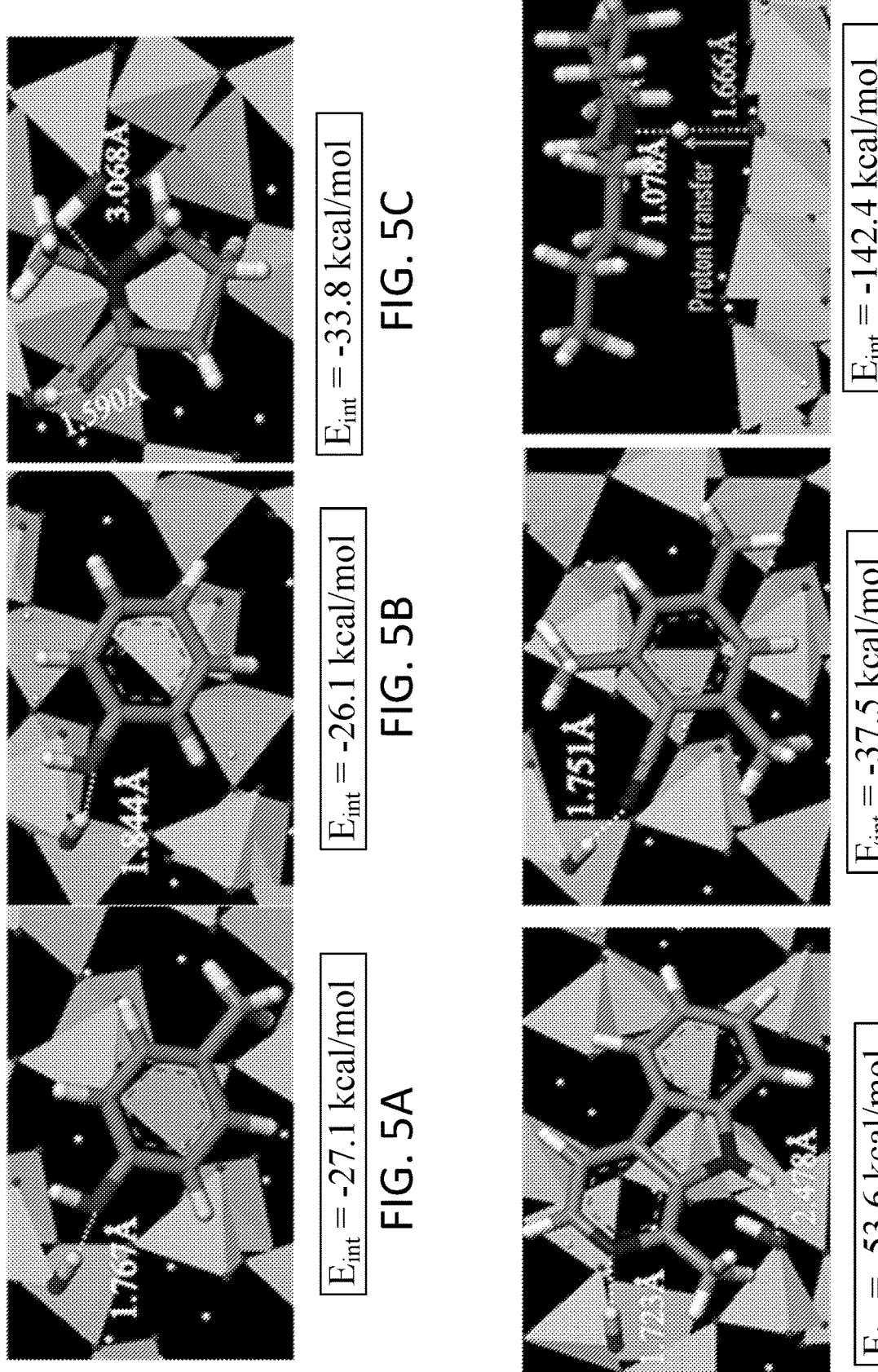
FIGS. 5A-5H illustrate the adsorption of hybrid bio-oil molecules on silica cluster model.
Figure 5H:

1-methyl-9H-pyrido[3,4-b] indole (harmane) shown in FIG. 5D contains an indole aromatic ring fused to a methyl pyridine. According to these results, the most stable harmane-silica complex was consistent with an interaction energy of −53.6 kcal/mol in which two hydrogen bonds were formed: one between the nitrogen of pyridine ring and a hydrogen of silanol ($N^{\delta-}$ . . . $^{+\delta}HO$, 1.723 Å); and another between the hydrogen of NH group in indole ring (pyrrole part) and an oxygen of silica surface ($NH^{\delta+}$ . . . $^{-\delta}OH$, 2.478 Å). The fused aromatic rings stayed parallel to the silica surface, to cover more interactions. The lone pair of electrons on the N atom of a pyridine ring does not contribute to aromaticity, so they are capable of forming hydrogen bonds. In contrast, the lone pair of electrons on the nitrogen of an indole (pyrrole part) participate in aromaticity of the fused rings, so they are not sufficiently basic to catch a hydrogen of silanol. According to these results, the adsorption complex in which only an $NH^{\delta+}$ . . . $^{-\delta}OH$ hydrogen bond (2.069

Å) formed between the hydrogen of the pyrrole's NH group and an oxygen of a silanol group was consistent with −36.4 kcal/mol interaction energy. In the latter complex, the $N^{\delta-}$ . . . $^{+\delta}HO$ hydrogen bond of the pyridine ring was missing.

Figures 6A, 6B, 6C:
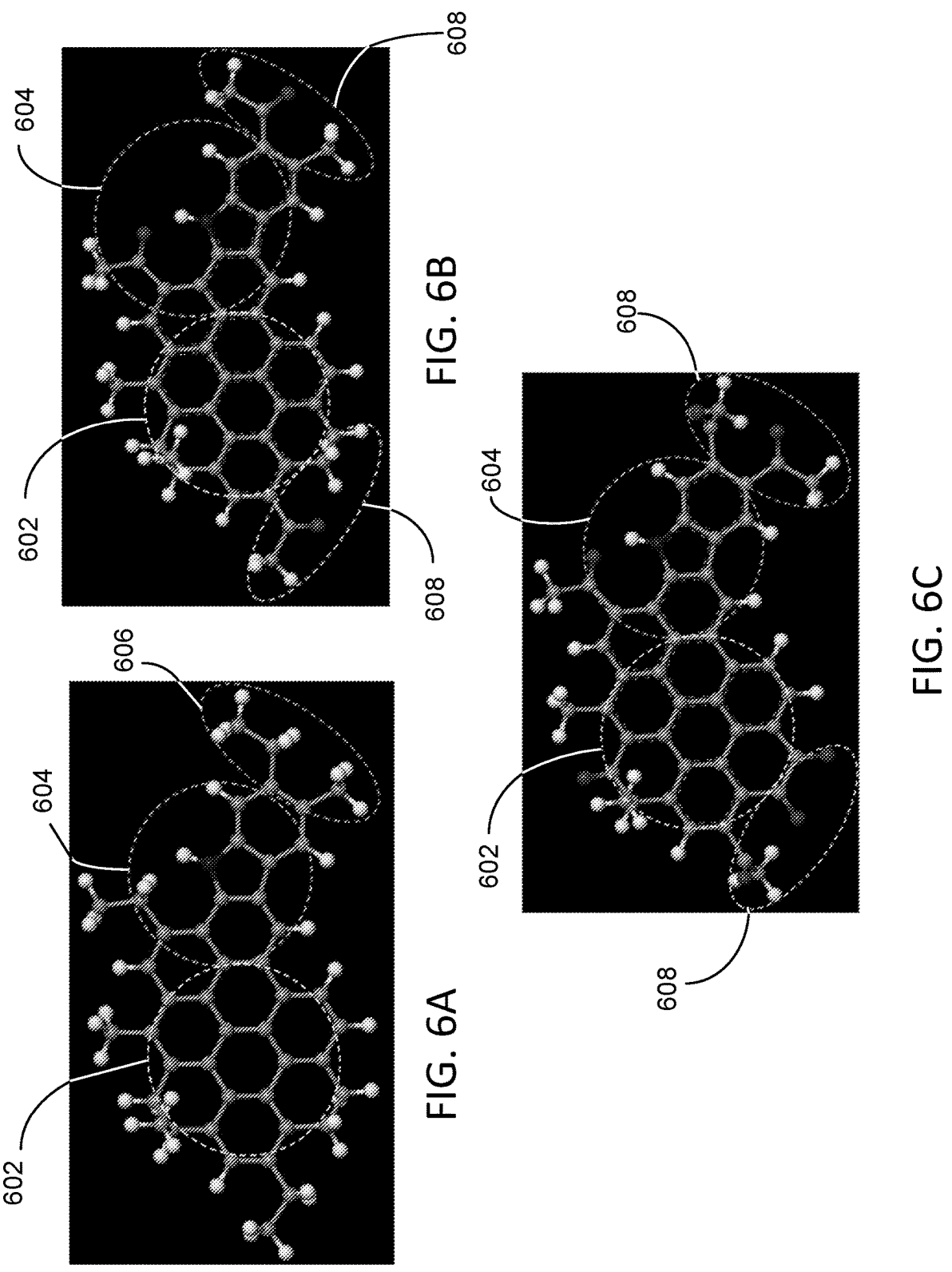
FIGS. 6A-6C illustrate the molecular geometries of unaged asphaltene(U), mildly aged asphaltene(M), and severely aged asphaltene(S) models, respectively. Different active zones for interactions are specified.

Interactions of HY molecules with asphaltenes. To track the affinity of HY molecules toward asphaltenes, interactions of all HY molecules with asphaltene(U), asphaltene (M), and asphaltene(S) were assessed. The asphaltene models have different active zones that can participate in interactions. These active zones, which are shown in FIGS. 6A-6C for asphaltene(U), asphaltene(M), and asphaltene(S) respectively, are a core condensed aromatic zone 602, a polar aromatic zone 604, alkyl groups 606, and polar oxidized zones 608. A range of interaction energies was calculated for each HY-asphaltene interaction. These results, provided in Table 2, show that HY molecules build stable complexes with any kind of asphaltene. However, for each HY, the interaction energy of HY-asphaltene is lower than the corresponding interaction energy of HY-silica; this indicates a significantly higher affinity of HY molecules toward the silica compared to their affinity toward the asphaltenes. According to these results, some HY molecules (such as phenols) showed an increasing trend in interaction energy with an increase in the oxidation degree of asphaltene. For some (such as N-methyl-2-pyrrolidone and amide), the latter trend is reversed; for the others, different behavior was obtained for each oxidation level. Since this is a mixture of these HY molecules, their different behaviors allow them to interact with different non-polar, polar, and aromatic parts of asphaltenes, providing an overall constructive collaboration for interacting with any kind of asphaltene in the composite. Possibilities when a complex of HY-asphaltene is formed include: a) the HY molecules may be added to asphaltene agglomeration and build a bigger agglomeration and b) the HY molecules act as peptizing agents that disperse the asphaltene molecules. Without being bound by theory, a three-step mechanism is proposed for an HY mixture's capability to desorb asphaltenes from a silica surface. At the first stage, the HY molecules attach to the asphaltene layer on the silica. At the second stage, HY molecules open the lock forces of asphaltene-asphaltene and intercalate between the adsorbed asphaltene agglomerations, dissolving and dispersing the asphaltene molecules as much as possible. At the third stage, when HY molecules reach near the asphaltene-silica interface, HY molecules compete strongly with asphaltene to be adsorbed on the silica, due to the high affinity of HY molecules toward a silica surface. As more and more HY molecules reach the silica surface, the asphaltene-silica interactions become weaker, and ultimately HY molecules completely remove the asphaltenes from the silica. The replacement of asphaltenes with HY molecules on the silica surface could be highly beneficial for the durability of bituminous composites when exposed to water. HY adsorbed to silica can be quite resistant against water. To analyze the final stage of the three-step mechanism, the asphaltene-silica system was tested in the presence of selected HY molecules.

TABLE 2

| Interaction energies ($E_{int}$, kcal/mol) for interaction of hybrid bio-oil molecules with unaged, mildly aged, and severely aged asphaltenes | | |
| --- | --- | --- |
| $E_{int}$ Asphaltene(U) | $E_{int}$ Asphaltene(M) | $E_{int}$ Asphaltene(S) |
| P-Cresol −(12.5 to 16.4) | −(12.4 to 19.8) | −(16.0 to 23.5) |
| Phenol −(10.6 to 15.0) | −(9.1 to 16.4) | −(13.9 to 18.6) |

TABLE 2-continued

Interaction energies ($E_{int}$, kcal/mol) for
interaction of hybrid bio-oil molecules with
unaged, mildly aged, and severely aged asphaltenes

| | $E_{int}$ Asphaltene(U) | $E_{int}$ Asphaltene(M) | $E_{int}$ Asphaltene(S) |
|---|---|---|---|
| N-methyl-2-Pyrrolidone | -(16.1 to 19.1) | -(10.2 to 17.0) | -(13.3 to 16.4) |
| 1-methyl-9H-Pyrido[3,4-b]indole | -(15.4 to 25.7) | -(17.3 to 22.4) | -(21.8 to 25.6) |
| N-methyl-Myristamide | -(26.2 to 32.3) | -(20.9 to 27.4) | -(24.1 to 24.9) |
| Nonadecanamide | -(32.9 to 33.8) | -(24.5 to 36.1) | -(30.7 to 33.5) |
| 1-butyl-Piperidine | -(14.7 to 19.5) | -(7.6 to 16.8) | -(6.1 to 17.1) |
| Mesitonitrile | -(19.3 to 21.4) | -(11.6 to 22.0) | -(11.1 to 20.8) |

Figure 5G:
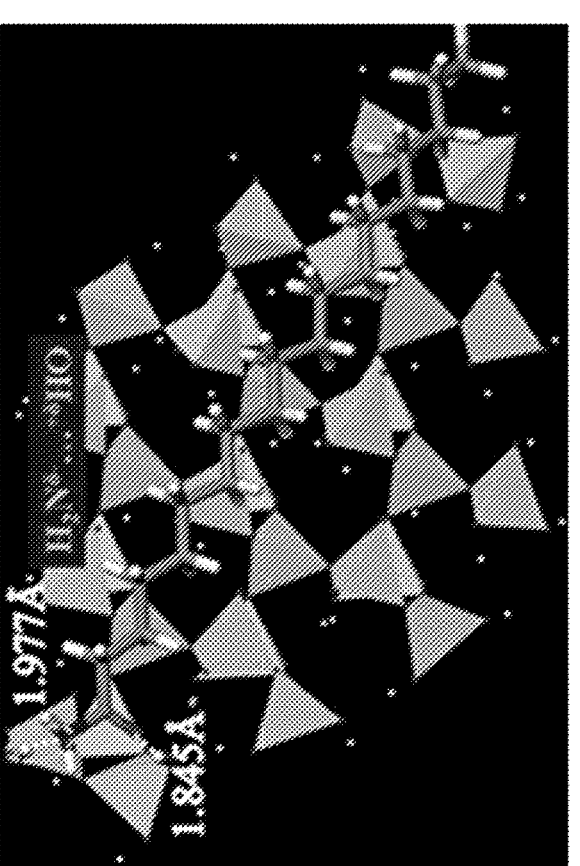

Asphaltene-silica interaction in the presence of HY molecules: deactivation of the effects of aging and changes in asphaltene-silica interaction: polar attacks and polar retreating. The high affinity of HY molecules toward silica implies that they can be effective competitors for the asphaltene molecules adsorbed on silica. The asphaltene-silica interaction was analyzed in the presence of HY molecules and the changes were tracked in asphaltene-silica interaction energy after HYs were added. The polar attack of selected HY molecules was tested to determine if it can lead to polar retreating of asphaltene-silica interaction. Severely aged asphaltene was selected for this part, since it showed the highest interaction energy with silica, which makes it the most difficult to be washed away from the silica surface. As mentioned before, severely aged asphaltene forms multiple hydrogen bonds with silica as shown in FIG. 4. These polar interactions are like additional locks (compared to unaged asphaltene) that should be opened first. Referring to FIGS. 5C and 5G, N-methyl-2-pyrrolidone and nonadecanamide are compounds with carbonyl groups (C=O) that formed hydrogen bonds with silica cluster and provided strong interactions. These hydrogen bonds are good candidates to compete with the $C=O^{\delta-} \ldots {}^{+\delta}HO$ hydrogen bonds of asphaltene(S)-silica. Comparing the size of the N-methyl-2-pyrrolidone and nonadecanamide, N-methyl-2-pyrrolidone shown in FIG. 5C is a small molecule that has a greater chance to penetrate to the asphaltene(S)-silica interface and orient correctly to form hydrogen bonds with silica. It is more difficult for the nonadecanamide with a very long alkyl chain to reorient itself for forming multiple hydrogen bonds, when asphaltenes are still strongly attached to the silica. Another proper candidate that may unlock the polar attractions between silica and asphaltene is 1-butyl-piperidine shown in FIG. 5F, which showed an acid-base interaction with silica. Although the phenols do not seem to be as effective as N-methyl-2-pyrrolidone and 1-butyl-piperidine to deactivate the $C=O^{\delta-} \ldots {}^{+\delta}HO$ hydrogen bonds of asphaltene(S)-silica, for comparison, a phenol was included in this part as well. FIGS. 7A-7E show results calculations on five molecular models: the asphaltene(S)-silica in presence of two N-methyl-2-pyrrolidone molecules shown in FIG. 7A; two 1-butyl-piperidine molecules shown in FIG. 7B; two N-methyl-2-pyrrolidone and two 1-butyl-piperidine molecules shown in FIG. 7C; two N-methyl-2-pyrrolidone and two phenol molecules shown in FIG. 7D; four N-methyl-2-pyrrolidone molecules shown in FIG. 7E.

Figures 7A, 7B, 7C, 7D:
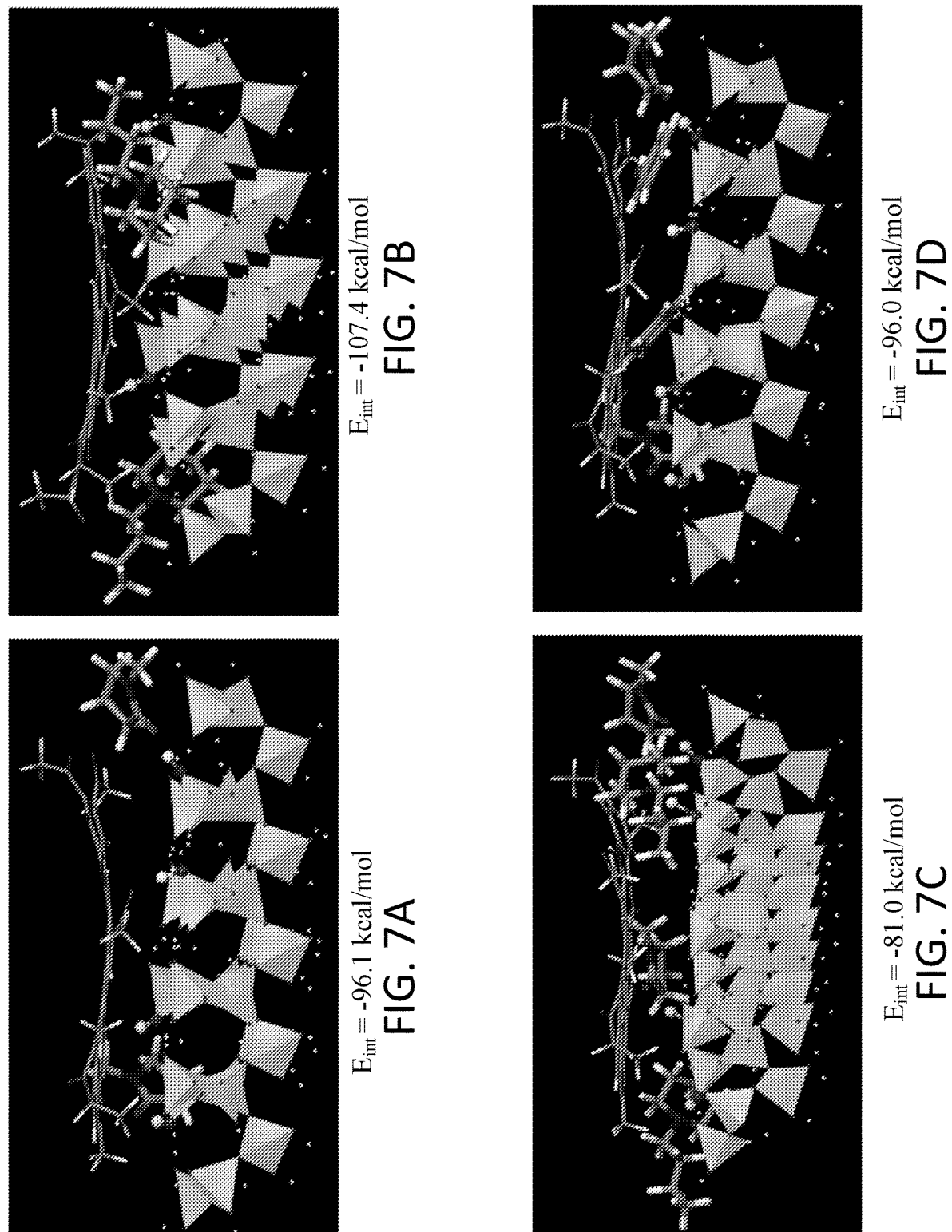
FIGS. 7A-7E illustrate the deactivation of hydrogen bonds of asphaltene(S)-silica and decrease in the interaction energy of asphaltene(S)-silica in the presence of two N-methyl-2-pyrrolidone molecules, two 1-butyl-piperidine molecules, two N-methyl-2-pyrrolidone and two 1-butyl-piperidine molecules, two N-methyl-2-pyrrolidone and two phenol molecules, and four N-methyl-2-pyrrolidone molecules, respectively.
Figure 7E:
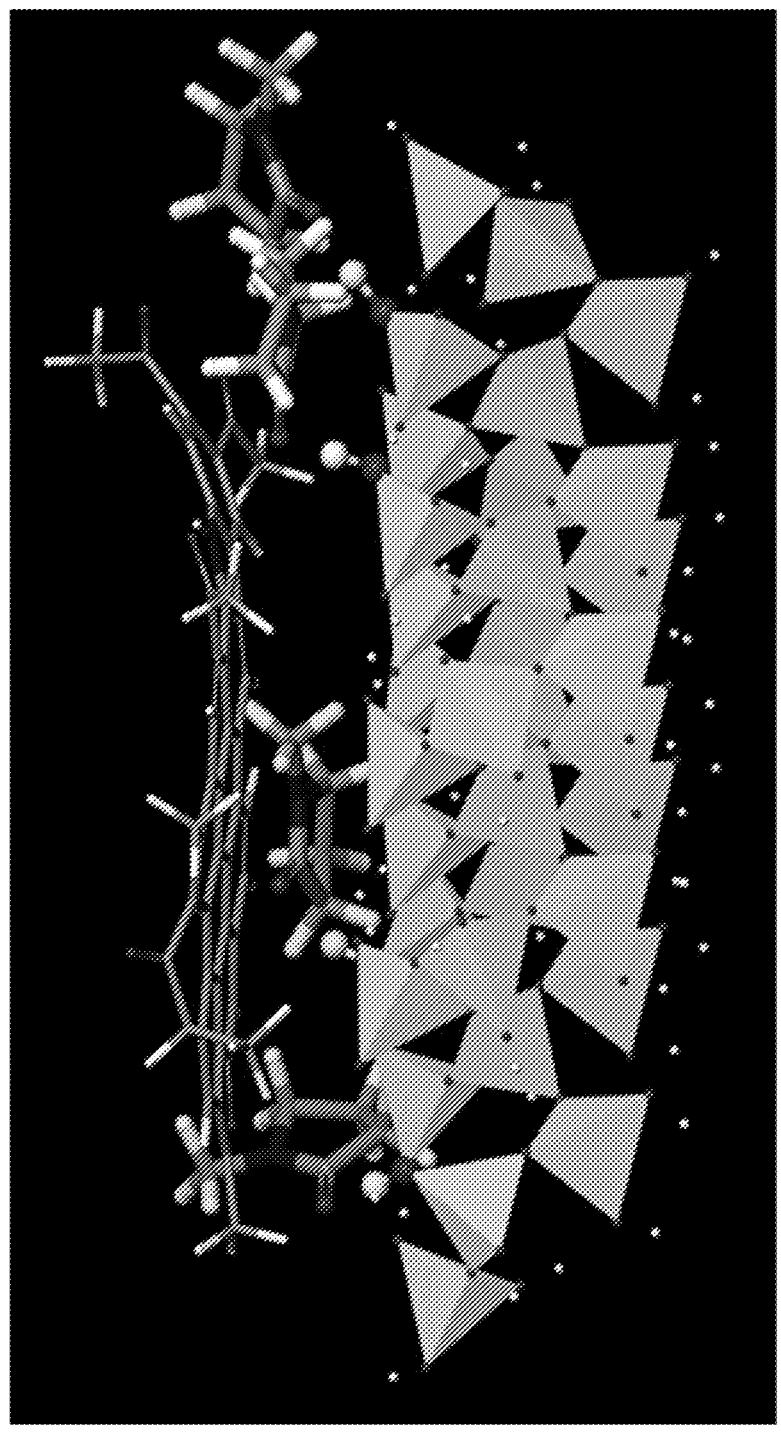
Figure 8:
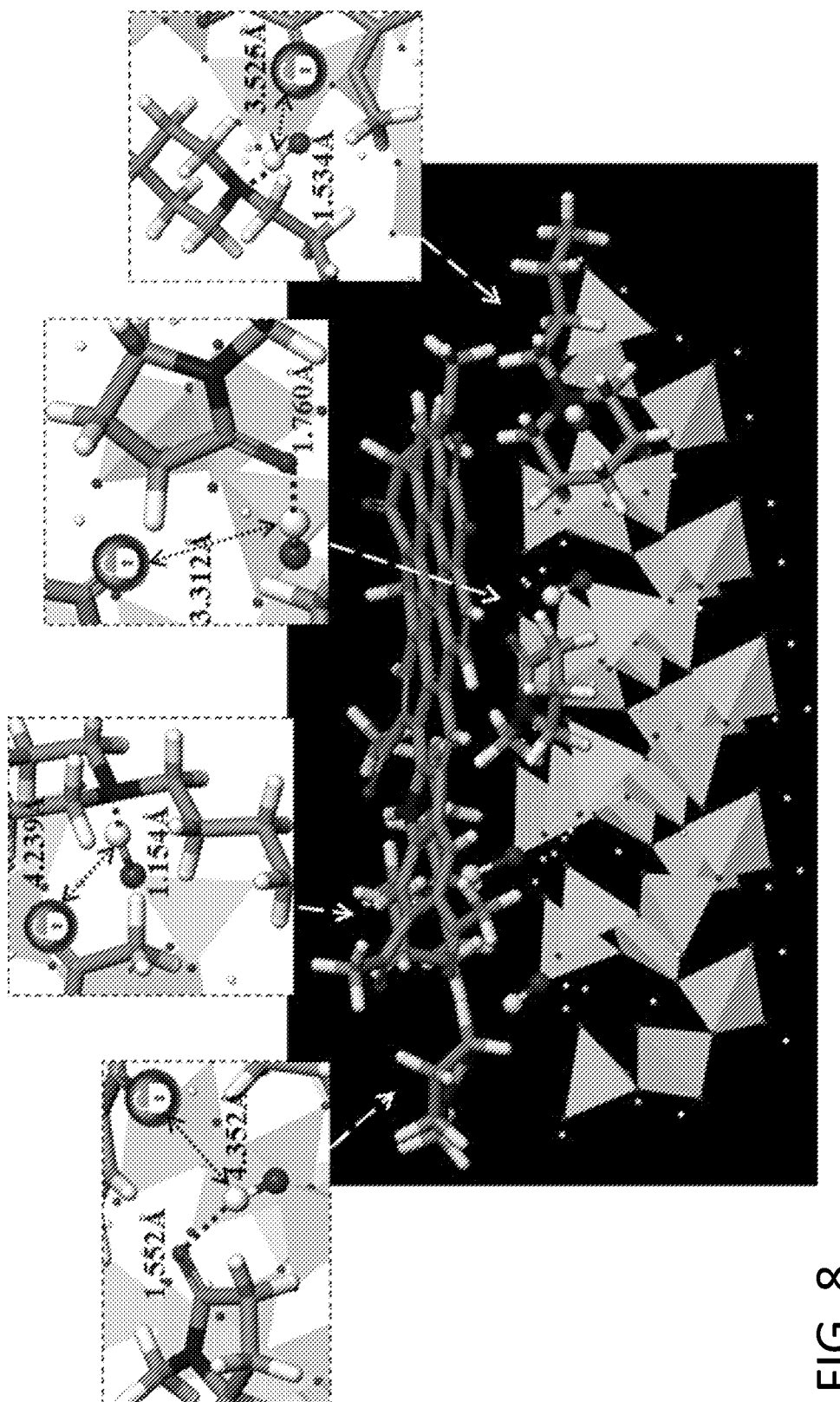
FIG. 8 illustrates the polar attacks of two 1-butyl-piperidine and two N-methyl-2-pyrrolidone molecules to the hydrogen bonding sites of asphaltene(S)-silica system shown in FIG. 7C.

As shown in FIGS. 7A and 7C-7E, the presence of N-methyl-2-pyrrolidone notably affected the polar interactions between asphaltene(S) and silica. When two N-methyl-2-pyrrolidone were placed near the hydrogen-bond sites of asphaltene(S)-silica as shown in FIG. 7A, the N-methyl-2-pyrrolidone molecules attacked to the latter sites, pushed away the carbonyl groups of the asphaltene(S), disrupted the $C=O^{\delta-} \ldots {}^{+\delta}HO$ hydrogen bonds of asphaltene(S)-silica, and formed two new hydrogen bonds with silica, resulting in a decrease in interaction energy of asphaltene(S)-silica within this complex. The $C=O^{\delta-} \ldots {}^{+\delta}HO$ hydrogen bonds of asphaltene(S)-silica that were 1.690 Å and 1.909 Å lengthened to 4.651 Å and 3.181 Å, respectively. The new $C=O^{\delta-} \ldots {}^{+\delta}HO$ hydrogen bond distances of (N-methyl-2-pyrrolidone)-silica interaction were 1.507 Å and 1.566 Å. The interaction energy of asphaltene(S)-silica was decreased from -115.0 kcal/mol (in the absence of N-methyl-2-pyrrolidone) to -96.1 kcal/mol (in the presence of two N-methyl-2-pyrrolidone molecules). In a similar system shown in FIG. 7B containing two 1-butyl-piperidine molecules, the interaction energy of asphaltene(S)-silica decreased to -107.4 kcal/mol. The two hydrogen bonds of asphaltene(S)-silica in this complex were unlocked and their distances lengthened to 4.316 Å and 4.434 Å. The obtained results indicate the effectiveness of 1-butyl-piperidine and N-methyl-2-pyrrolidone in diminishing the effect of aging on asphaltene(S)-silica adhesions. FIG. 7C shows that two N-methyl-2-pyrrolidone and two 1-butyl-piperidine molecules disrupted all four hydrogen bonds of asphaltene(S)-silica and led to an interaction energy of -81.0 kcal/mol for asphaltene(S)-silica. In FIG. 7D, the results showed that phenol is not as effective as N-methyl-2-pyrrolidone and 1-butyl-piperidine for deactivating the polar attractions between asphaltene(S) and silica. The interaction energy of asphaltene(S)-silica of the system shown in FIG. 7D containing two N-methyl-2-pyrrolidone and two phenols was not changed significantly (-95.5 kcal/mol) compared to the system shown in FIG. 7A containing two N-methyl-2-pyrrolidone molecules (-96.1 kcal/mol), and the two hydrogen bonds of asphaltene(S)-silica remained intact. In fact, polar attack of phenol did not lead to polar retreating of asphaltene. In the model shown in FIG. 7E, with four N-methyl-2-pyrrolidone molecules, all hydrogen bonds of asphaltene(S)-silica were diminished, and four new hydrogen bonds were formed between the N-methyl-2-pyrrolidone molecules and silica. The calculated interaction energy for asphaltene(S)-silica in this system is -80.7 kcal/mol. The latter value is very near the interaction energy of asphaltene (U)-silica (-78.8 kcal/mol), indicating how these selected HYs could deactivate the consequences of aging on asphaltene-silica interactions. FIG. 8 shows expanded views of all retreated and newly formed hydrogen bonds for the system shown in FIG. 7C. The disrupted hydrogen bonds of asphaltene(S)-silica and newly formed hydrogen bonds of HY-silica are shown in black two-way arrows and blue dashes, respectively. The retreated oxygen atoms of asphaltene(S) are shown by open locks. The asphaltene(S)-silica hydrogen bond distances in absence of HY molecules were previously shown in FIG. 4. Overall, pure N-methyl-2-pyrrolidone and a mixture of N-methyl-2-pyrrolidone and 1-butyl-piperidine (of hybrid oil) are polar invaders that are effective in disrupting and negating the effect of aging on asphaltene-silica adhesion.

Figure 9D:
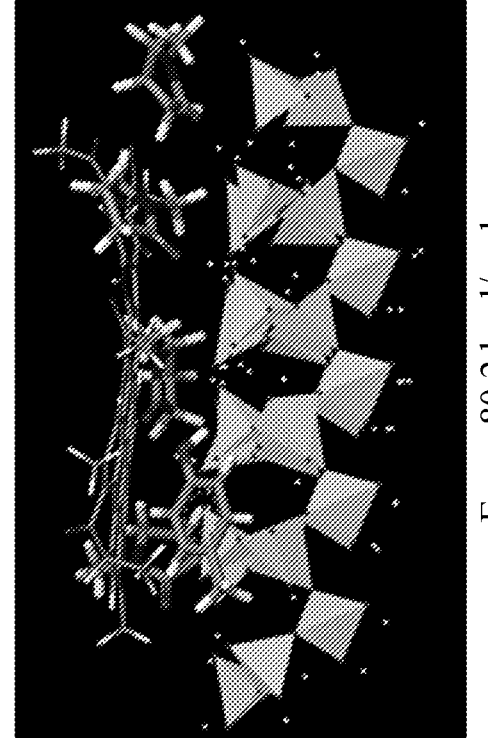

Continued facilitation of asphaltene desorption from silica. To pursue the effect of HY molecules on weakening the asphaltene(S)-silica strength, after the polar interactions were disrupted, selected HY molecules were added the system shown in FIG. 7E. The new molecular model systems all contain the components shown in FIG. 7E, which was a complex of asphaltene(S)-silica and four N-methyl-2-pyrrolidone molecules, plus these molecules: nonadecanamide shown in FIG. 9A; harmane shown in FIG. 9B; mesitonitrile shown in FIG. 9C; p-cresol shown in FIG. 9D; harmane and nonadecanamide shown in FIG. 9E; and harmane and 1-butyl-Piperidine shown in FIG. 9F. The results showed a continuous decrease in the stability of asphaltene (S)-silica by introducing more HY molecules to the system. Comparing systems shown in FIGS. 9A-9D, a fused aromatic compound with nitrogen content (harmane shown in FIG. 9B) was more effective at destabilizing the asphaltene (S)-silica interaction at this stage (−72.8 kcal/mol) than a long-chain amide (nonadecanamide, −75.6 kcal/mol shown in FIG. 9A) followed by mesitonitrile (−77.0 kcal/mol shown in FIG. 9C) and finally, a phenol (p-cresol, −80.2 kcal/mol shown in FIG. 9D). The latter result shows that phenols in an HY mixture are not the most effective species for detaching the asphaltene from silica surface. They can help to dissolve the asphaltenes and facilitate the asphaltene desorption, but with less effectiveness compared with other polar or polar aromatic HY molecules, at least in the early stage of desorption.

Figure 9E:
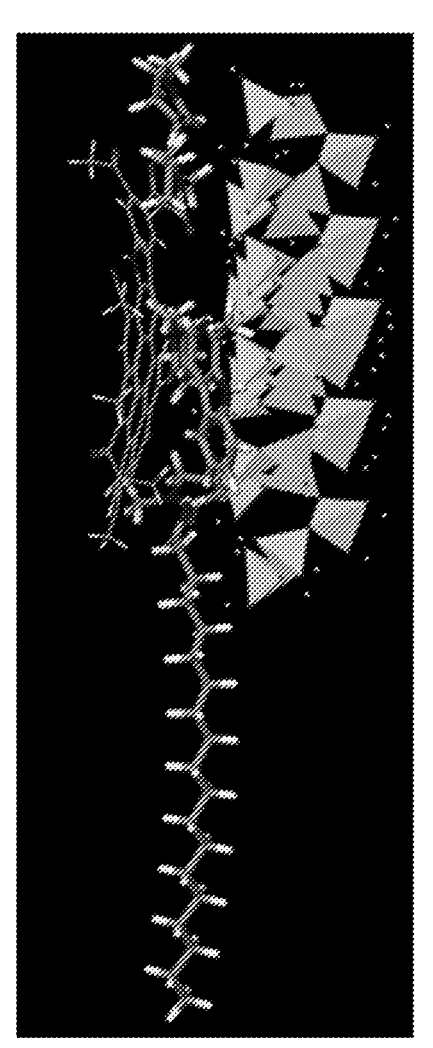
Figure 9F:
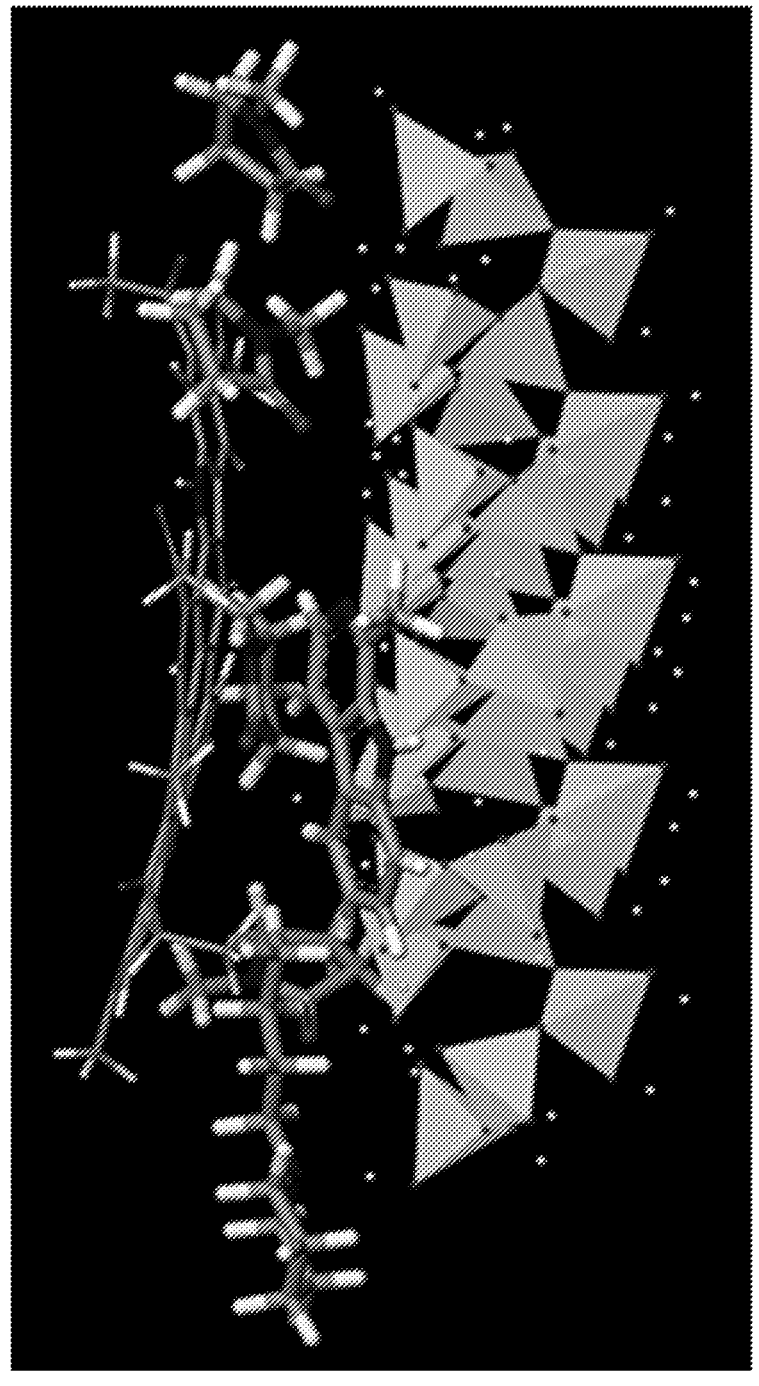

Systems shown in FIGS. 9E and 9F indicate that cooperation of selected HY molecules led to a greater decrease in the interaction energy of asphaltene(S)-silica compared with the individual HY molecules. The interaction energy within system shown in FIG. 9F (including four N-methyl-2-pyrrolidone, harmane, and 1-butyl-piperidine) is −63.4 kcal/mol, indicating a 45% reduction in asphaltene(S)-silica adhesion strength. Thus, after opening the polar locks between asphaltene(S) and silica, the presence of other HY molecules helps to further weaken the asphaltene(S)-silica interaction, until the HY molecules can intercalate between the asphaltene and silica, replace the asphaltene molecules, and wash them out from the silica surface.

Figures 10A, 10B:
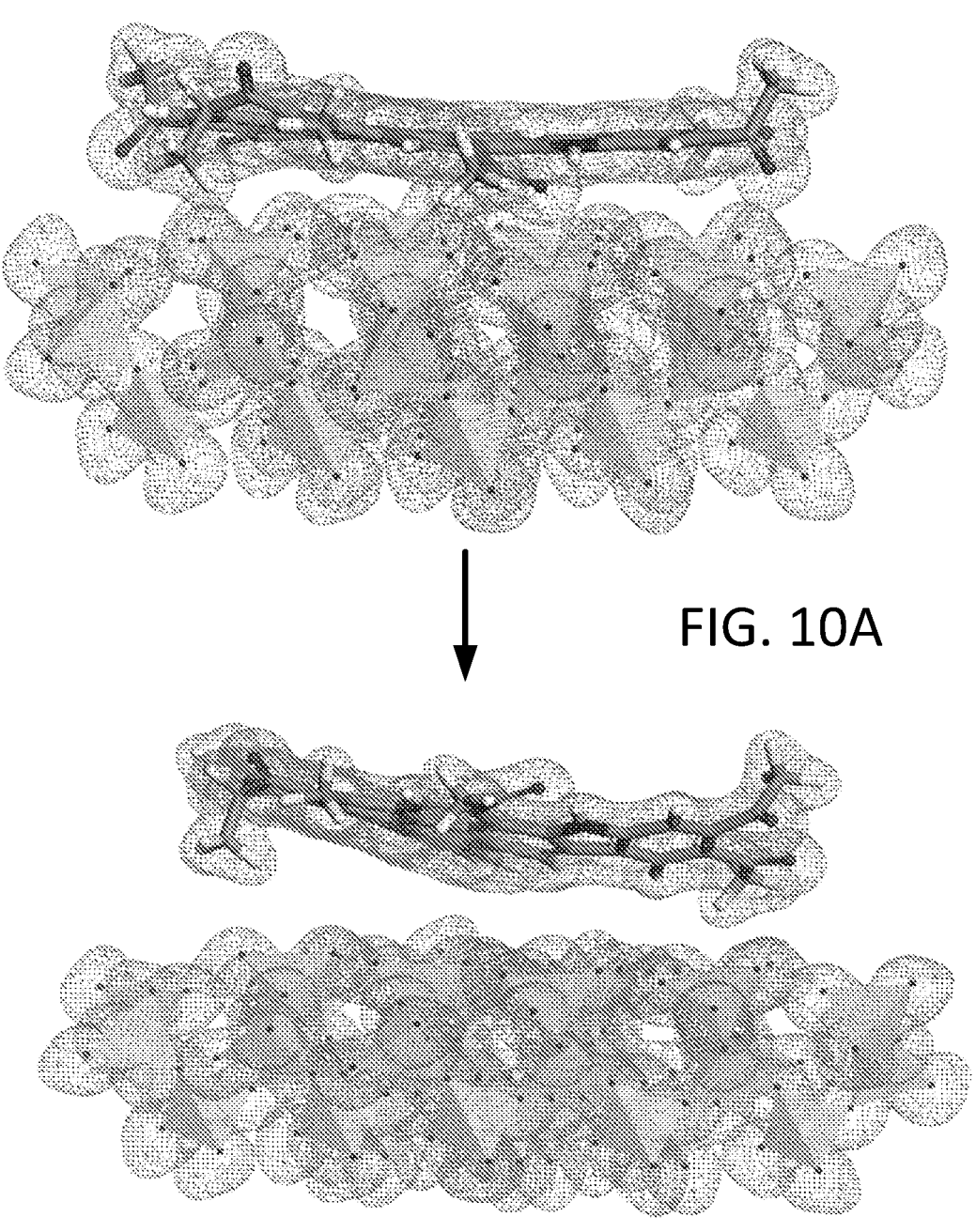
FIGS. 10A and 10B illustrate electron density plots for asphaltene(S)-silica interaction in the absence and presence of HY molecules, respectively, for the system shown in FIG. 9F.

FIG. 10A shows the electron density map for asphaltene (S)-silica system shown in FIG. 4 in the absence of HY molecules. FIG. 10B shows the same density map calculated in the presence of HY molecules as described for FIG. 9F. In the absence of HY molecules, asphaltene(S) held close to silica surface shows some density overlaps with silica as shown in FIG. 10A. Separation of electron densities of asphaltene(S) and silica in presence of the HY molecules shown in FIG. 9F is observed in FIG. 10B. To better show the interaction of the asphaltene(S) and the silica surface, the HY molecules were omitted from the final optimized geometry shown in FIG. 10B. In the latter complex, asphaltene molecular structure is somewhat bent and pushed farther away from the silica surface.

Figure 11A:
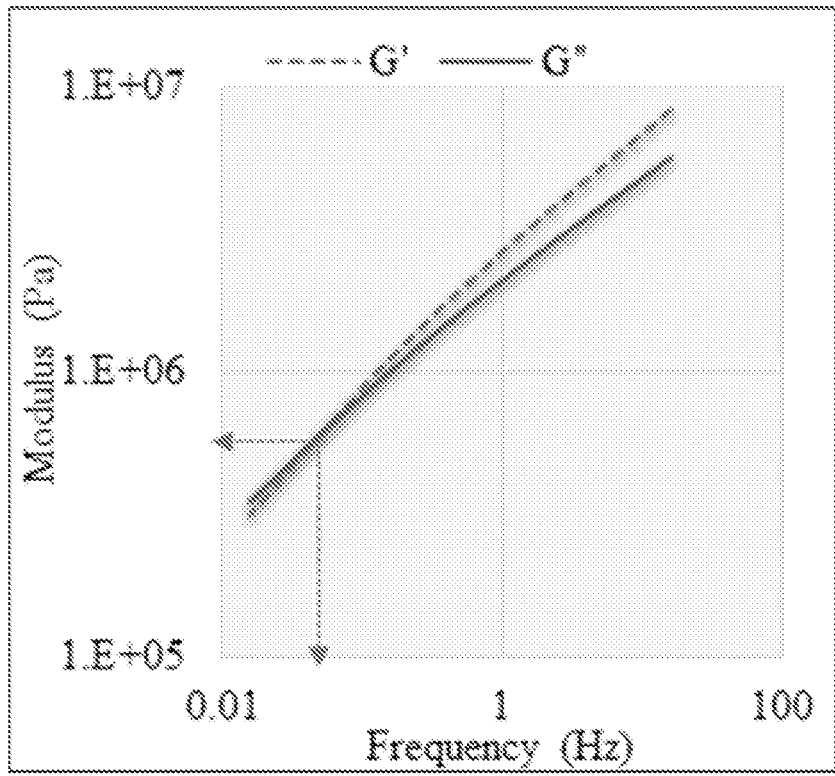
FIGS. 11A-11B display storage modulus (G') and loss modulus (G") plots for aged bitumen in the absence and presence of HY, respectively.
Figure 11B:
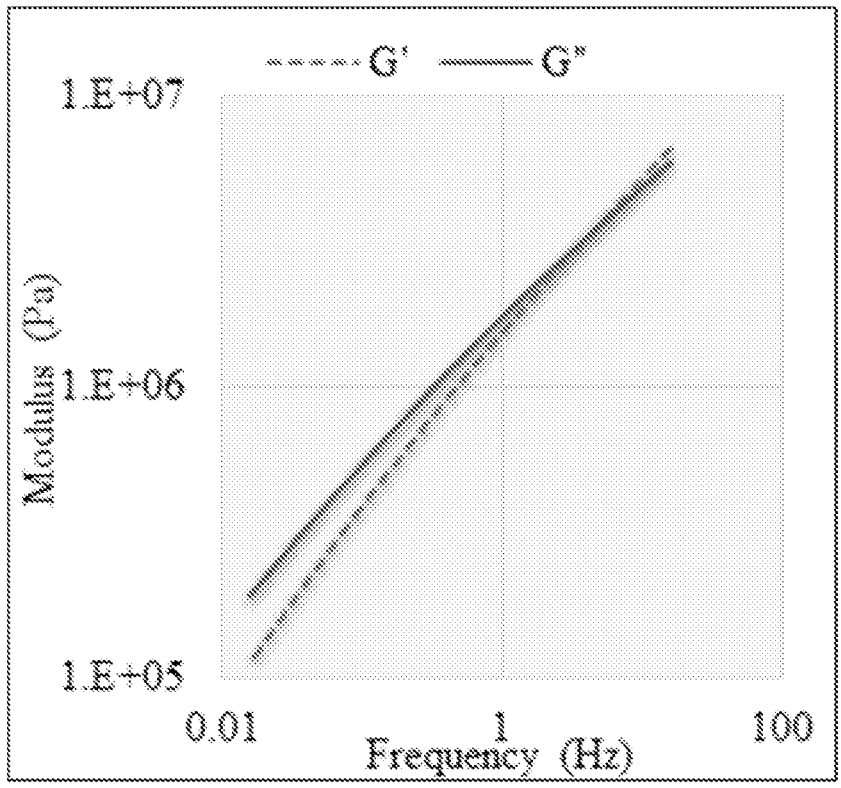

Rheological analysis: Crossover modulus and crossover frequency. The storage modulus (G') and loss modulus (G") of different samples at 25° C. were plotted against frequency. It should be noted that the latter values may be described as the in-phase (G') and out-of-phase (G") components of the complex modulus (G*) as well. The frequency at which G' and G" cross is referred to as the crossover frequency. The corresponding modulus at the crossing point is called the crossover modulus. The crossover modulus has been shown to have a strong correlation with the aggregation of asphaltenes after aging: the crossover modulus shifts to lower values for aged samples. From FIGS. 11A and 11B, the crossover modulus and crossover frequency values have been calculated for samples aged bitumen and aged bitumen with HY. Table 3 shows the corresponding values.

TABLE 3

| Crossover modulus and crossover frequency values for aged bitumen and aged bitumen with HY samples | | |
|---|---|---|
| | aged bitumen | aged bitumen with HY |
| Crossover Modulus (Pa) | 0.49 E+06 | 4.33 E+06 |
| Crossover Frequency (Hz) | 0.31 | 7.35 |

From Table 3, it is evident that the aged bitumen with HY sample has higher values of crossover modulus and crossover frequency compared to the aged bitumen samples. Due at least in part to aging, the crossover modulus and crossover frequency decrease. After the addition of HY rejuvenator, the crossover modulus increased from 0.49 MPa to 4.33 MPa, and the crossover frequency increased from 0.31 Hz to 7.35 Hz. These significant increases in the crossover modulus and the crossover frequency demonstrate the rejuvenation efficacy of the HY bio-oil to revitalize aged bitumen.

Figure 12A:
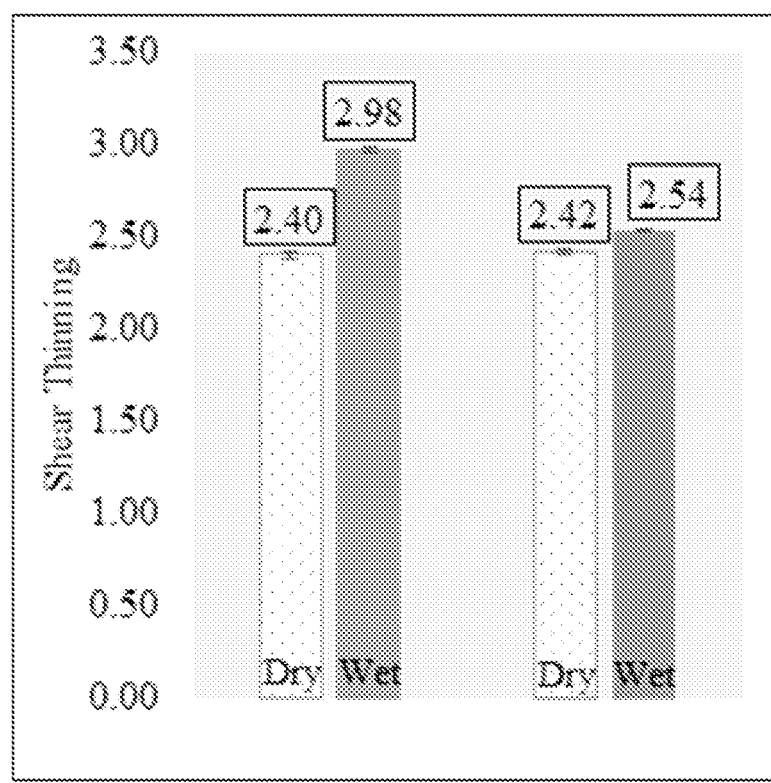
FIG. 12A displays dry and wet shear thinning values for aged bitumen with waste cooking oil (WCO) on the left and aged bitumen with WCO plus HY on the right.
Figure 12B:
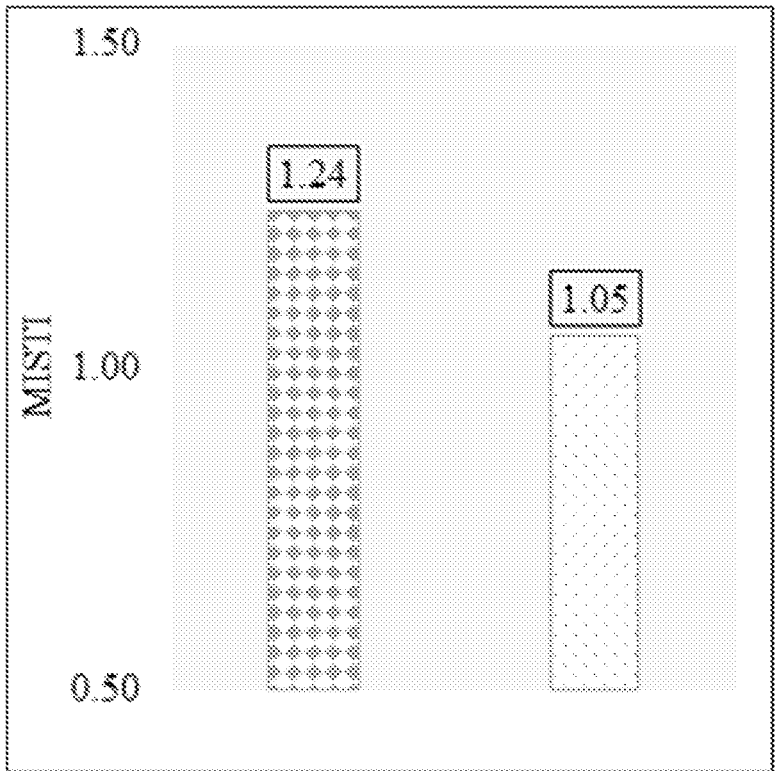
FIG. 12B displays moisture-induced shear-thinning index (MISTI) values for aged bitumen with WCO on the left and aged bitumen with WCO plus HY on the right.

Moisture-Induced Shear-Thinning Index (MISTI) Results. FIG. 12A shows dry and wet shear-thinning plot of a moisture susceptible bitumen sample (aged bitumen with waste cooking oil (WCO)) before (left) and after (right) introduction of HY. FIG. 12B shows the MISTI value (ratio of wet and dry shear thinning) plots before (left) and after (right) introduction of HY. The MISTI value, which is a measure of moisture resistance, was calculated from the shear-thinning values in dry and wet conditions using Eq. 3. MISTI values closer to 1.0 indicate higher resistance to moisture damage. The original sample (aged bitumen with WCO) which is a bitumen rejuvenated by WCO is a highly moisture susceptible bitumen and showed a high MISTI value (1.24). HY rejuvenator was added to this highly moisture sustainable bitumen (aged bitumen with WCO) to examine whether it can improve its resistance to moisture.

Referring to FIG. 12A, addition of HY to this highly moisture susceptible bitumen (aged bitumen with WCO) enhanced its resistance to moisture as evidenced by nearly no change in the shear-thinning value after extended water exposure. Assembly and crystallization of alkane acid compounds of WCO at the silica-bitumen interface increased the moisture susceptibility of bitumen. According to these results, the MISTI value (the ratio of wet to dry shear-thinning) was reduced from 1.24 to close to one after HY was introduced; this in turn indicates significant enhancement in resistance to moisture. This can be attributed to preferential adsorption of HY to siliceous stone which let HY supersede WCO in adhering to siliceous stones playing as a bridge with bitumen matrix. It has been documented that for a rejuvenator to be durable, the difference in shear-thinning value before and after water exposure should be negligible. Thus, the bitumen modified with HY rejuvenator, which showed nearly no change in shear-thinning when exposed to water, was considered as durable.

Intermolecular interactions between solvent and silica surface and between solvent and adsorbed asphaltenes impact the ability of solvent to dissolve and remove the pre-adsorbed asphaltenes. Electrostatic attractions especially in forms of hydrogen bonding between water and the silanol group of silica led to formation of water layer on silica surface that pushed the asphaltene deposits away from silica. A hybrid solvent (composed of toluene and NMP) can be synthesized to activate both kinds of interactions (with asphaltene deposits and silica surface), to maximize the desorption power of the hybrid solvent.

Interactions between asphaltenes and silica. The desorption process depends at least in part on the pre-adsorbed particles' tendency towards the surface. The other major factor is the interactions between the surface and the solvent. These interactions are evaluated via DFT tools and the results have been shown in FIGS. 13A-13E. When bitumen is mixed with aggregate to form asphalt pavement, bitumen's attraction to the aggregate becomes the main force that forms the internal cohesion of the asphalt pavement. FIG. 13A shows aged asphaltene and a silicate surface modeling this interaction. When the asphaltene and the silicate surface are kept in the vicinity of each other, it was found that the main adsorptive interaction is between oxygen atoms on the asphaltene and hydrogen atoms on the silicate surface, forming a hydrogen bond. The electron density diagram shown in FIG. 13B illustrates these interactions.

To enter the age factor in the calculations, three models of asphaltene were used at different stages of oxidation: UA (unaged asphaltene), MA (mildly aged asphaltene), and SA (severely aged asphaltene). As FIG. 13C shows, all asphaltene models strongly interact with the silica surface. However, their interaction energies vary widely, with the lowest value demonstrated by the UA, followed by the MA, followed by the SA showing the highest interaction energy. This is attributed to the increasing number of oxygen-containing functional groups in the asphaltene molecule as time progresses; aged asphaltene-silica interactions show a larger ratio of hydrogen bonds to van der Waals (vdW) attractions than unaged asphaltene-silica, and thus create a stronger interaction. In cases of aged asphaltenes, the added ketone groups formed hydrogen bonds with silanol groups of silica that replaced the previously prominent C—H vdW interactions and established a more stable and stronger interaction. SA asphaltene, with more C═O groups in its structure, formed the most hydrogen bonds and showed the highest interaction energy among the studied scenarios (~15% higher than MA, and ~30% higher than UA). As a result, as asphaltene ages, desorption of which from silica becomes more difficult, and stronger solvent/recycling agents are needed to detach the aged hydrocarbon from the siliceous surface.

Interactions between asphaltenes and solvents. The stability of a solution depends largely on the ability of the solvent to effectively interact with the solute. The asphaltene molecule has different sites for interacting with other molecules. In general, these sites can be divided into three main categories: (1) fused aromatic rings; (2) polar heteroatoms; and (3) aliphatic substitutions. To assess the interactions between the models of asphaltene (UA, MA and SA) and selected solvents (toluene, NMP and toluene/NMP hybrid), their interaction energies were calculated using DFT approach, the results of which are shown in FIG. 13E. Initially, one molecule of toluene was compared with one molecule of NMP for their interaction energies with asphaltene. Interactions of each individual solvent molecule (toluene or NMP) with different active sites of asphaltenes were considered. The abovementioned active sites are core aromatic rings, polar aromatic containing pyrrole ring and alkyl groups in UA. For interactions with MA and SA, the oxidized regions containing C═O groups were considered as additional active sites for interactions with solvent molecule. To evaluate the efficacy of the hybrid scenario, a set of one NMP and four toluene molecules were compared in interaction energies with a set of five toluene molecules. To do so, five molecules of toluene were placed on different parts of each asphaltene model (UA, MA, and SA) and interaction energies were obtained. Then, five separate calculations were done (for each asphaltene model) by replacing one of the five toluene molecules by one NMP. The error bars shown in FIG. 13E represent the range of interaction energies for different interacting complexes. While toluene interacts with the non-polar aromatic core and functional groups, the inclusion of NMP allows the hybrid solvent to also interact with the polar functional groups of asphaltene. Therefore, the positioning of the hybrid solvent changes its interaction energy with the asphaltene molecule. Considering the different active sites for placing the NMP, the hybrid solvent, 4 toluenes+1 NMP, was compared with pure toluene (5 toluene) in FIG. 13D. Two of the possible positioning, named synergistic and antagonistic models which are related to the highest and lowest interaction energies, have been shown. According to the results, the presence of NMP additive in conjunction with toluene promotes the asphaltene dissolution, with the synergistic interaction energy being nearly 8% higher than that of the toluene.

Figure 14:
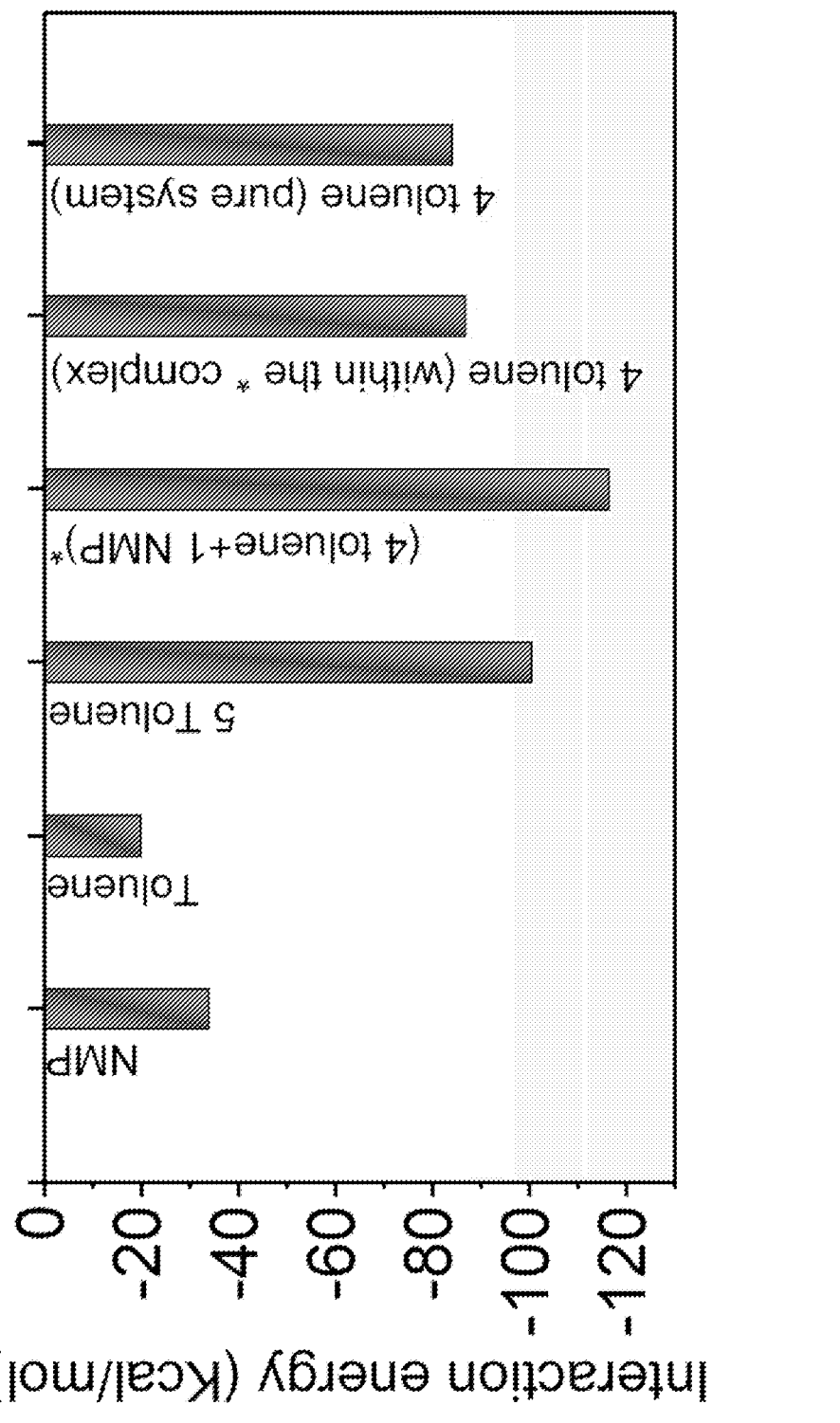
FIG. 14 shows interaction energies between silica and the four combinations of toluene and NMP from DFT analysis.

Interactions between silica and solvents. The silica-solvent interaction determines the susceptibility of the asphaltene-silica pair towards the penetration of the solvent. FIG. 14 shows the interaction energies for adsorption of 1 NMP, 1 toluene, 5 toluene, and 4 toluene+1 NMP on silica. These results showed a higher interaction energy for NMP-silica (−33.8 kcal/mol) than for toluene-silica (−19.8 kcal/mol). Furthermore, by substituting an NMP molecule in pure toluene (4 toluene+1 NMP) the interaction energy increased by 16 kcal/mol indicating on promotional role of NMP on solvent-silica interaction. If this increase in energy is compared with the energy difference (14.0 kcal/mol) of NMP-silica (−33.8 kcal/mol) and toluene-silica (−19.8 kcal/mol) interactions, 2.0 kcal/mol of additional stability is observed, which further demonstrate on the synergy between the NMP and toluene molecules for being adsorbed onto the silica surface. To see if this synergy has affected the interaction of the 4 toluene fragments within the complex, the interaction energy of (4 toluenes)-silica in the complex was calculated by removing the NMP from the final optimized geometry and compared to a system containing 4 toluenes. The interaction energy in hybrid scenario was 1.9 kcal/mol more than in toluene alone. According to the results, the C═O group of the NMP molecule formed a strong hydrogen bond with the silica surface. Such a strong interaction of this small molecule with the silica surface indicates that this molecule can be a strong competitor to the asphaltene molecules. In fact, the strength of the hydrogen bond formed with the silica surface by the C═O group of NMP is more than that formed by the C═O groups of asphaltene molecules.

Figures 15A, 15B, 15C, 15D, 15E, 15F:
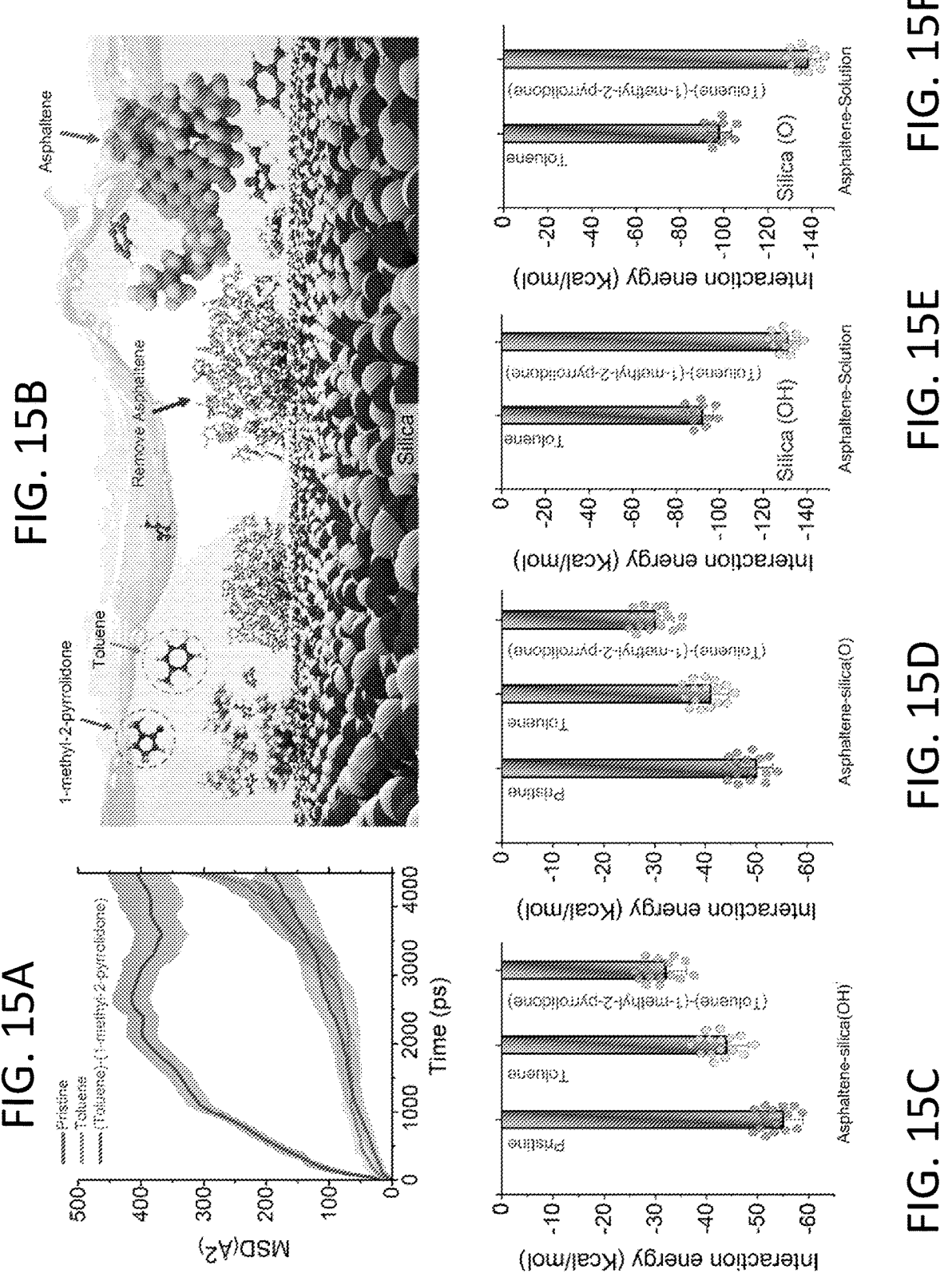
FIG. 15A shows mean square displacement (MSD) values for the asphaltene-toluene-silica ternary system.
FIG. 15B is a scheme showing asphaltene being detached from the silica surface.
FIGS. 15C-15F show interaction energy with and without the cleaners between asphaltene-silica(OH), asphaltene-silica(O), asphaltene-solution in the presence of silica(OH), and asphaltene-solution, respectively, in the presence of silica(O).

Molecular dynamics (MD) analysis was used to assess the effectiveness of the hybrid solvent on a larger scale. The models used for the asphaltene are highly oxidized, providing the highest attraction between asphaltene and silica. This way, the effectiveness of the solvent is evaluated against the most resilient film. Mean square displacement (MSD) values are used to inspect the displacement of particles over time, which is used to determine whether the particle is free in its movement, is transported, or bound. According to the MSD results in FIG. 15A, the asphaltene surrounded by the solvents is significantly harder to move. This means that the solvents strongly attached to the asphaltene particles and formed larger entities or conglomerates that are harder to move on their own. This effect is depicted in FIG. 15B, where the solvent molecules surrounded and pinned down the asphaltene particles on the silicate surface. Conversely, the solvent's attachment to the asphaltene particle is much stronger than the asphaltene's attachment to silica. This is better shown in terms of the interaction energy between different phases of the mixture near to bulk simulation.

FIG. 15C shows that with no solvent present (pristine), the interaction energy was at its peak; it was reduced by ~20% to −44.0 kcal/mol when toluene was added. In the hybrid solvent, this reduction in the interaction energy between asphaltene and silica(OH) was further reduced by ~27% to −32.0 kcal/mol. This was also the case for the silica(O) model shown in FIG. 15D, though the difference between the interaction energies was smaller. In addition, the interaction energy between asphaltene and solvent increased as toluene was swapped with the new hybrid solvent. This 44% increase from −90.0 to −130.0 kcal/mol (−95.0 to −140.0 kcal/mol for silica(O)) means a greater affinity between solute and solvent, which means a high degree of correlation between the two in their movement shown in FIGS. 15E-15F. Combined, these changes in the interaction energy mean supplementing pure toluene with NMP significantly improves its interaction with asphaltene and weakens the interaction energy between the asphaltene and the silica substrate. This makes the detachment and the transfer processes much easier. The resulting conglomerate, although larger and heavier, is more susceptible to water flow and thus can be washed from the silica surface much more easily. All models in the molecular dynamics (MD) simulations are the severely-aged asphaltene because its strong interaction with silica (strongest among all models) makes them the hardest to detach; so, if the desorption happens in this model, the method can also be used for the younger models.

Figures 16A, 16B:
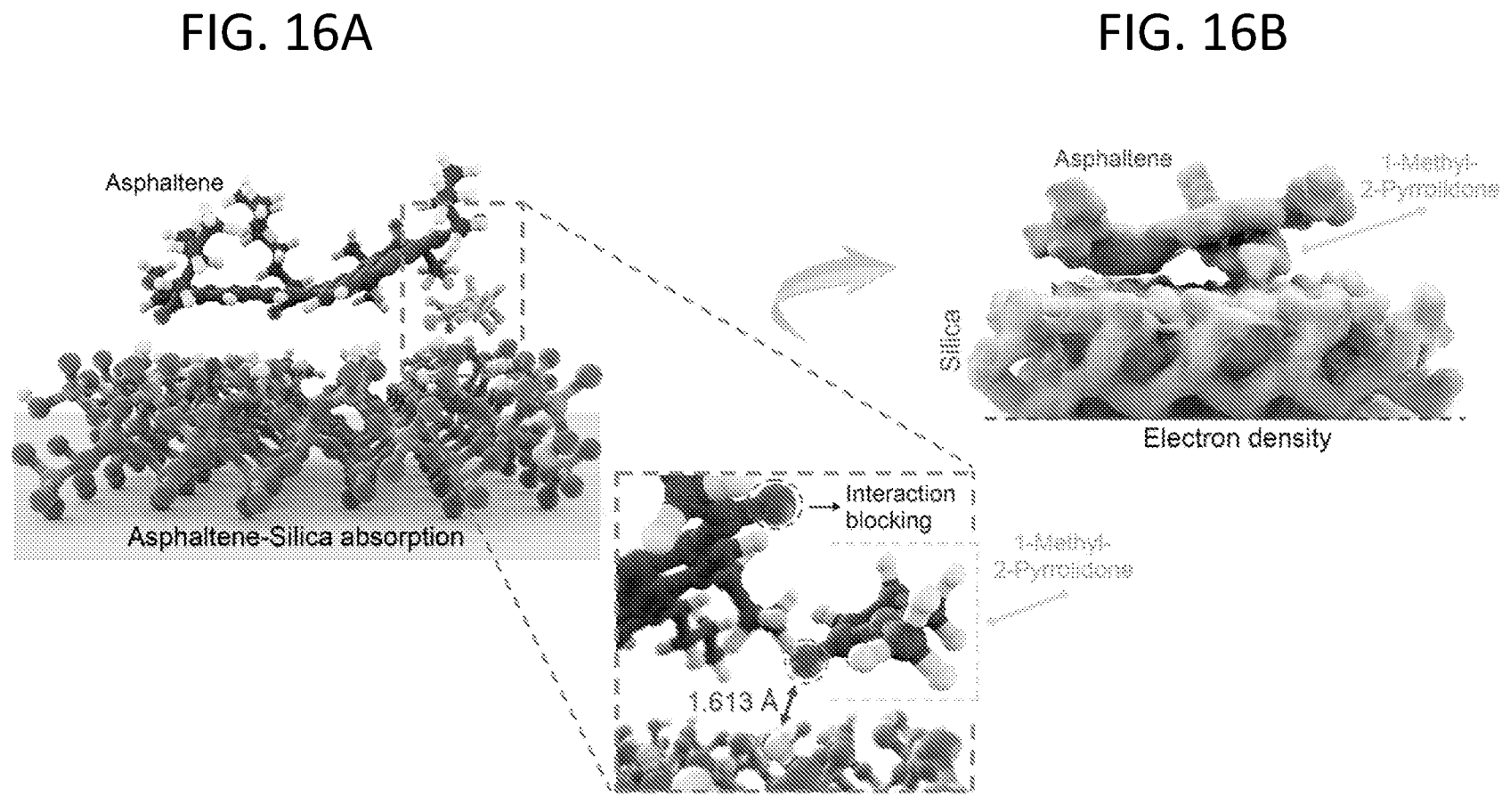

Unlocking the hydrogen bonds formed between asphaltenes and silica. The detachment process is facilitated by the presence of the solvents around asphaltene and between asphaltene and silica to block their interactions. DFT results showed that the hydrogen bonds between asphaltene and silica were diminished by adding NMP to the system. This is shown in FIG. 16A, where a molecule of NMP was situated near the asphaltene-silica hydrogen bond resulted in blocking the direct interactions between asphaltene and silica. The expanded view of FIG. 16A shows the hydrogen atoms of silica that formerly were involved in hydrogen bonds with asphaltene are now engaged with the oxygen atoms from NMP. The obstruction is also visible from the electron density perspective shown in FIG. 16B, where the NMP molecule was observed to partially detach the asphaltene from the silica surface and facilitate the desorption process.

Figure 17A:
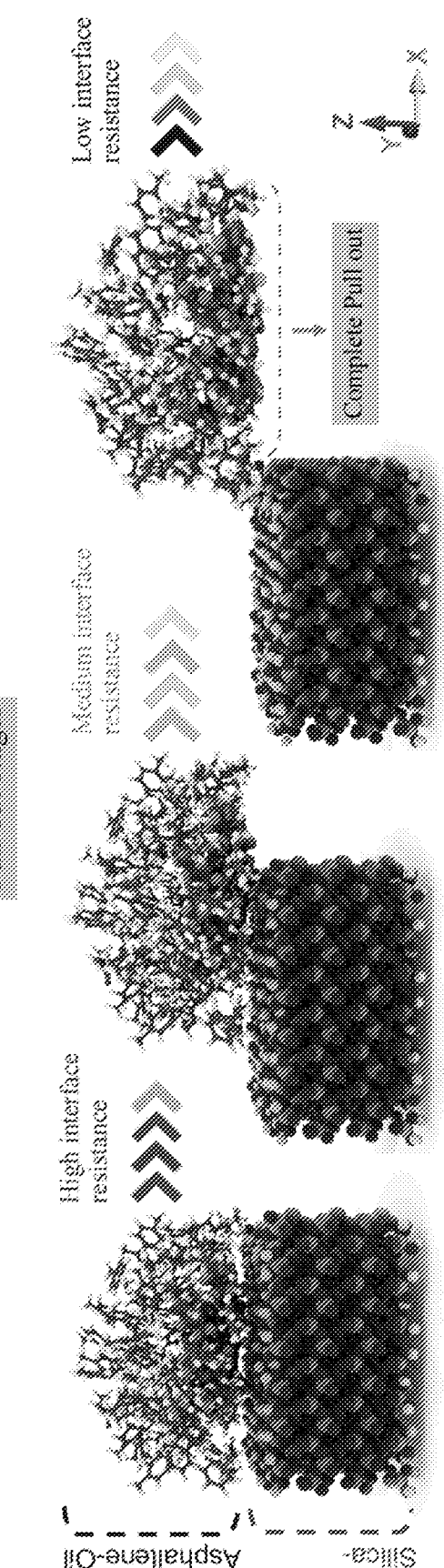
FIG. 17A illustrates the sliding asphaltene/oil conglomerate on silica surface.

Effects of the Hybrid solvent on microscale. Previously, it was established that asphaltene molecules are firmly attached to the silica surface via hydrogen bonds. This high interaction energy should be neutralized for the asphaltene particles to be detached from the surface. The solvent's role is to replace the asphaltene-silica interaction by asphaltene-solvent and silica-solvent interactions, thus facilitating the displacement of the asphaltene. The effectiveness of the proposed solvents was evaluated through the sliding test in MD simulation calculations depicted in FIG. 17A. The value of interaction energy was acquired as the asphaltene/oil slid on the silica surface and slowly detached from the surface and increasingly weakened the adsorptive interaction with the silica surface. Sliding and removing the asphaltenes happened as the all interactions, including the hydrogen bonds and non-bonded interactions, were weakened and finally severed.

Figure 17C:
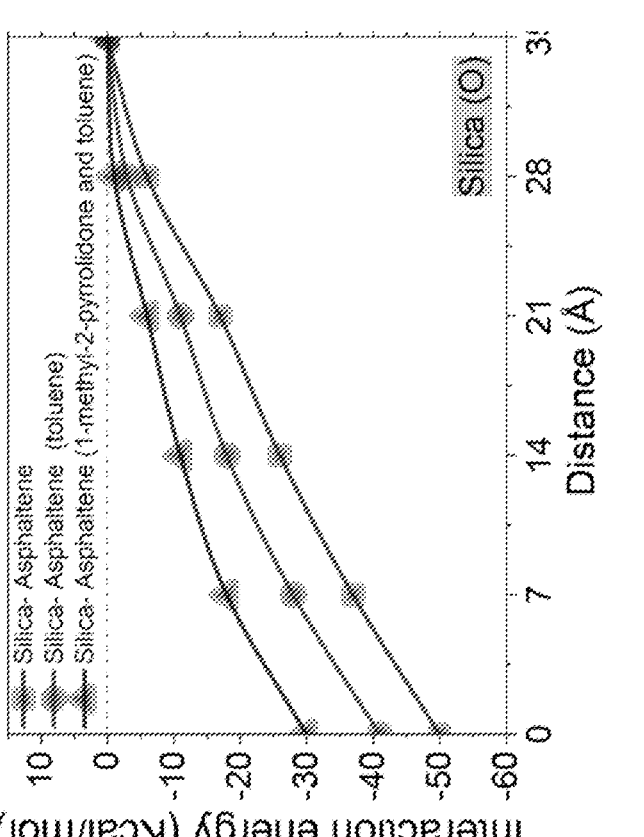
FIG. 17C shows a plot of the interaction energy between asphaltene/oil and silica(O).
Figure 17B:
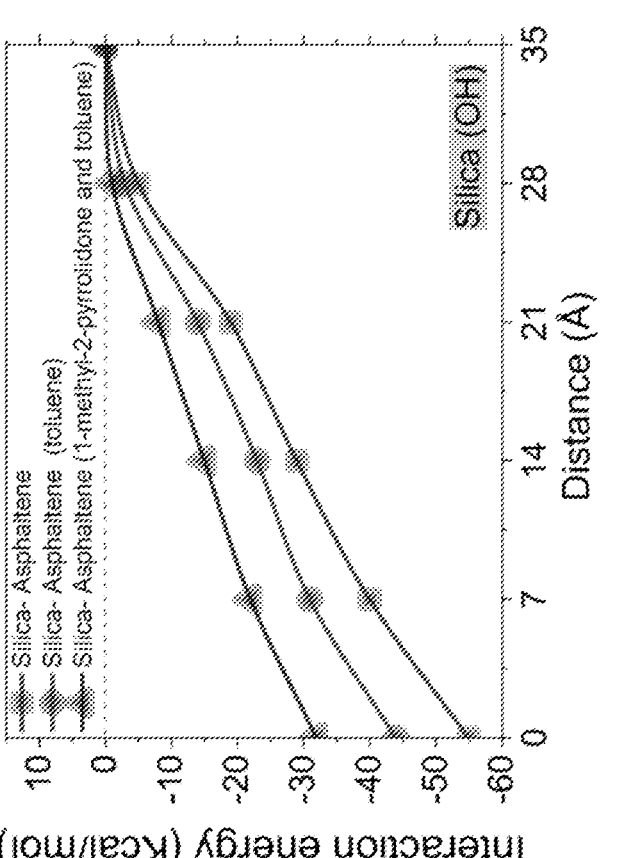
FIG. 17B shows a plot of the interaction energy between asphaltene/oil and silica(OH).

The results are shown in FIGS. 17B and 17C for both silica(OH) and silica(O), respectively. As the asphaltene conglomerate was pushed towards the edge, the interaction energy was reduced. However, the initial interaction energy between the silica-asphaltene pair determines the effectiveness of the solvent. The results show that the presence the hybrid solvent reduces the silica-asphaltene interaction energy by 40%, which is double the reduction toluene achieved.

Figure 17E:
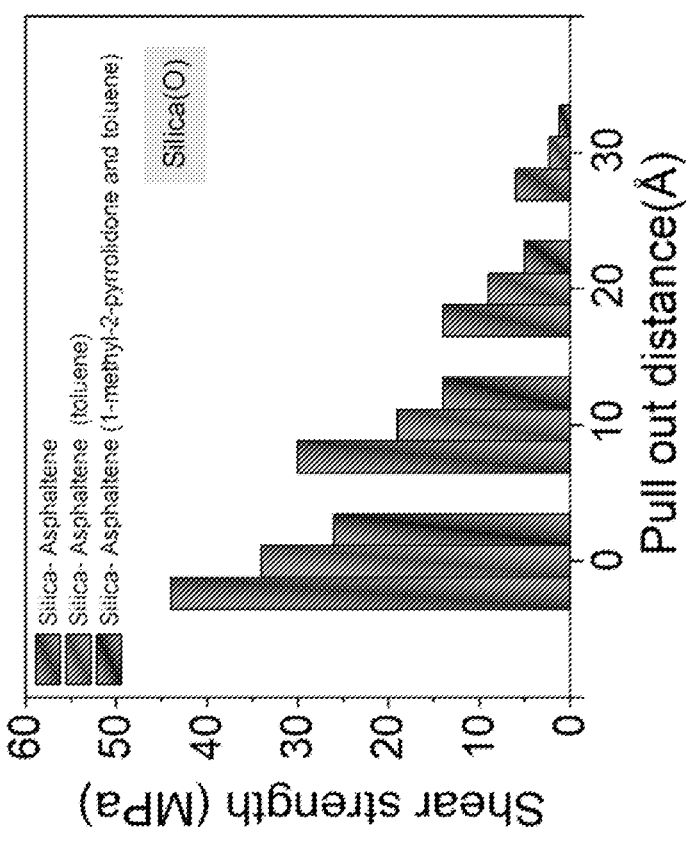
FIGS. 17D and 17E show plots of the shear strength between asphaltene/oil and silicate (OH) and silicate(O), respectively.
Figure 17D:
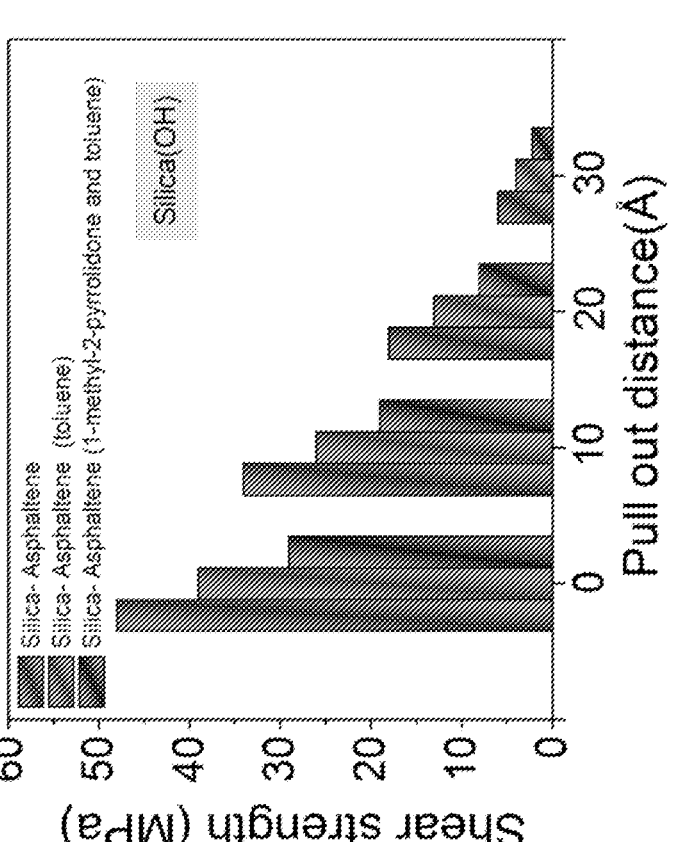

This has been reflected in the shear strength plots shown in FIGS. 17D and 17E, which show trends similar to those indicated in FIGS. 17B and 17C. These results show the effectiveness of NMP as an asphaltene solvent. NMP's high adsorption energy toward asphaltene helps build the asphaltene molecule into a large conglomerate covered with toluene and NMP molecules. In addition, NMP competes with asphaltene for the active sites on the silica surface and thus weakens asphaltene's interaction with the silica. Together, this double mechanism can effectively detach the asphaltene in the form of an asphaltene-oil conglomerate and facilitate its sliding over the silicate surface via fluid pressure.

Figures 18A, 18B, 18C, 18D, 18E:
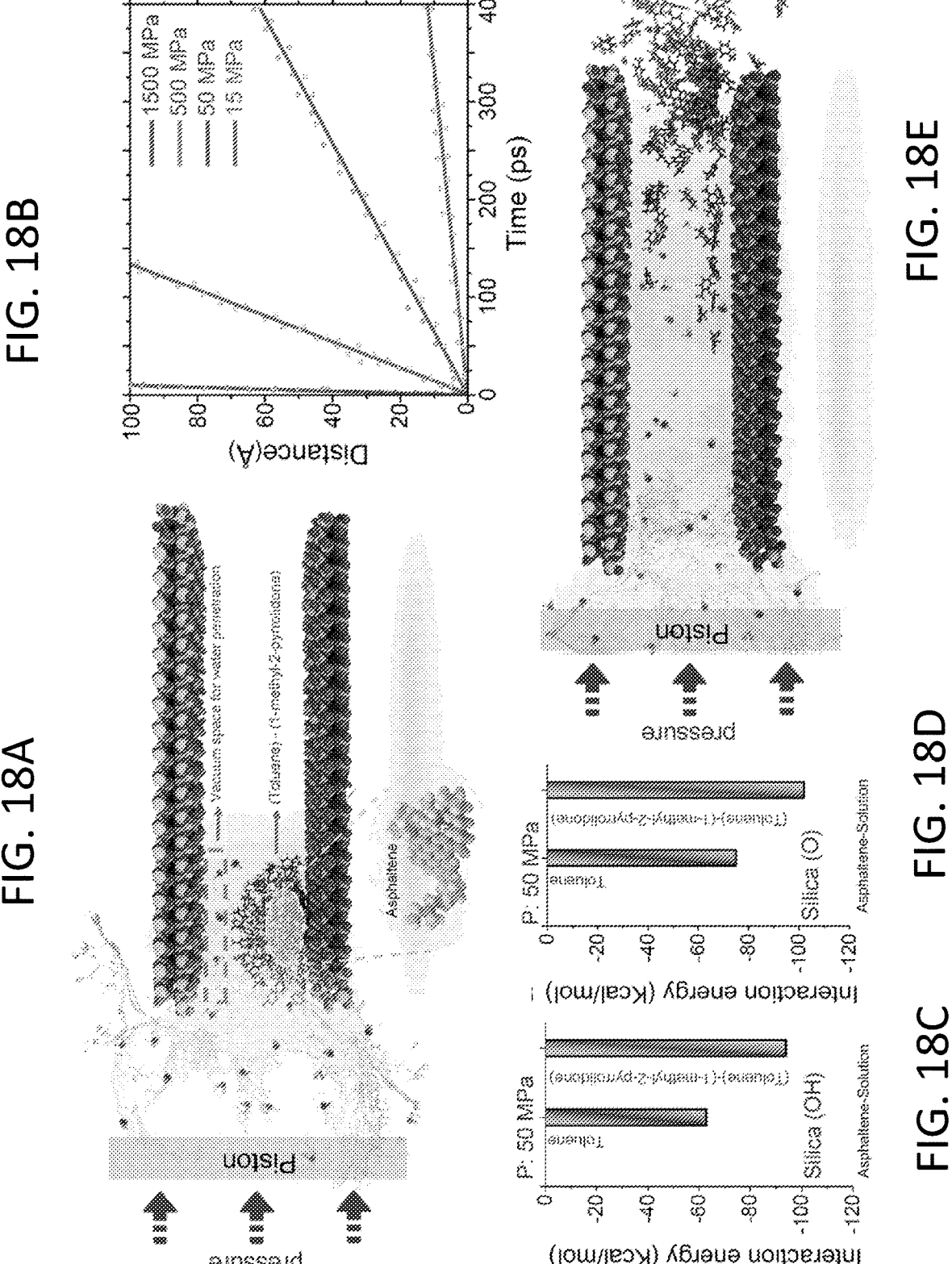
FIG. 18A depicts water flowing through silica-silica channel with the asphaltene/oil conglomerate inside.
FIG. 18B is a plot of moving speed of pressured water with respect to the applied pressure.
FIGS. 18C and 18D show the interaction energy between the asphaltene and the solution in the presence of silica(OH) and silica(O), respectively.
FIG. 18E depicts asphaltene/oil pushed out of the silica-silica channel with applied pressure.

The detachment process was tested by confining an asphaltene-oil conglomerate, where water was pressed to pass through a channel with the conglomerate adhered to the silica surface as depicted in FIG. 18A. The results are shown in FIG. 18B as a function of the applied pressure. With 15 MPa pressure, although sliding is possible, it is a relatively time-consuming task. With higher pressures, namely 50 MPa and higher, the sliding process was facilitated as much as two times the initial speed. Considering the 50 MPa pressure in the tank, the energy that binds the asphaltene to the solvent was evaluated to show the interconnection inside the washed conglomerate. This has been shown in FIGS. 18C and 18D, in the presence of silica(OH) and silica(O), respectively. The interaction energy values indicate a better performance of toluene/NMP mixture, as it showed 60% higher interaction energy with the asphaltene molecules compared with the sole toluene solvent. With the cohesion of the asphaltene-oil established, it is concluded that the asphaltene conglomerate would be easily sliding on the silica surface as a result of the applied pressure as depicted in FIG. 18E.

Figures 19A, 19B:
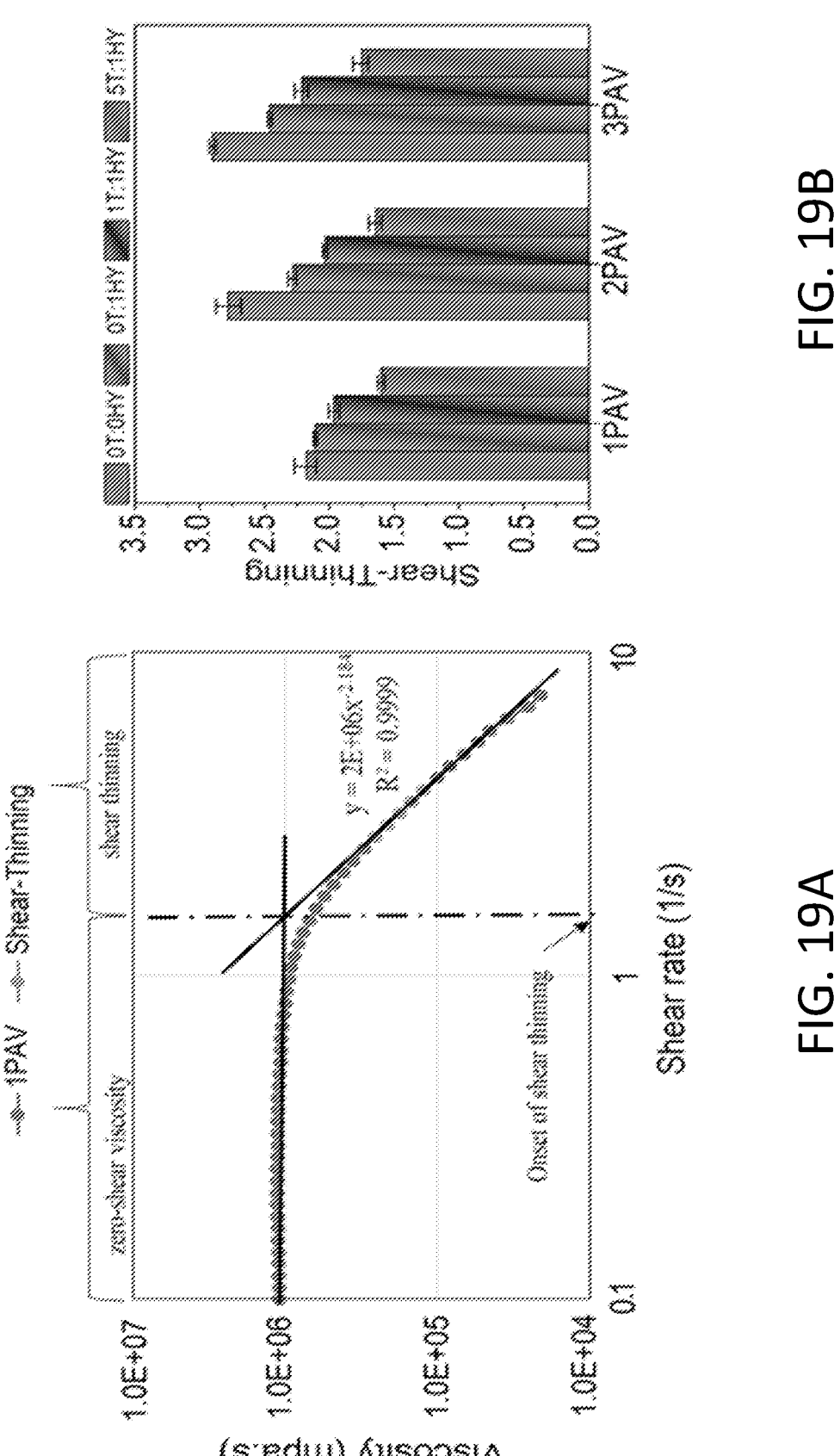
FIG. 19A shows the viscosity-shear rate for the pressure aging vessel sample 1 (1PAV) specimen.
FIG. 19B shows the shear-rate thinning of all PAV samples tested. The HY sample is NMP.

Empirical evidence. FIG. 19A shows the viscosity-shear rate diagram for the unaged specimen. The diagram was divided between the zero-shear viscosity and the shear thinning sections. The shear thinning rate, which describes the susceptibility of the mixture's cohesion against shear stress, was measured as the slope of the best-fitted line in the shear-thinning region.

FIG. 19B shows the shear-thinning results of the samples containing pure and hybrid solvents. It was found that all samples containing solvent had lower shear-thinning values compared to unmodified samples. It was also shown that aging increases the shear thinning of bitumen; the highest shear thinning was found for 3PAV (severely-aged bitumen), followed by 2PAV (mildly-aged bitumen), then 1PAV (un-aged bitumen), indicating an increase in adhesion to stones as aging progresses. The toluene:NMP ratio of 5:1 was found to be even more effective to desorb asphalt from stone than a 1:1 ratio, due to the higher number of nonpolar sites compared with the polar sites on the asphaltene molecule. This indicates that NMP in combination with toluene has a better desorption power to separate bitumen from aggregates. The trend remained the same for all asphalt specimens. However, this desorbing action was found to be most pronounced for severely-aged bitumen (3PAV) compared to other scenarios. The desorption of bitumen from stone (measured as a reduction of shear thinning) was found to be increased by 6.9%, 9.0%, and 8.6% for 1PAV, 2PAV, and 3PAV samples, respectively, for the 1T:1NMP case compared to the 0T:1NMP case. For the 5T:1NMP case, the desorption of bitumen from siliceous stone was increased by 23.4%, 23.0%, and 24.5% for the 1PAV, 2PAV, and 3PAV samples, respectively, compared to the 0T:1NMP case.

The base bitumen was PG 64-16 acquired from Holly-Frontier in Arizona with properties provided in Table 1. To age the bitumen, each sample was initially aged using a rolling thin-film oven (RTFO), to simulate the aging that occurs during the production of bitumen. Following that, all samples were aged again using a pressure aging vessel (PAV) following the ASTM standard for 20, 40, or 60 hrs to represent different levels of aging occurring in the field; the aged samples are referred to as 1PAV, 2PAV, and 3PAV, respectively.

Method for evaluation of the extent of desorption of asphalt from aggregates. Desorption of bitumen from stones was measured based on the change of shear-thinning rate in a matrix of bitumen and stones (represented by glass beads). The glass beads were impact-resistant abrasive glass beads amorphous structures and 100 microns diameter. Samples were prepared at 135° C. by mixing the desorption agent with the matrix of bitumen and stones for 30 min. To evaluate desorption, a dynamic shear rheometer (Anton Paar Rheometer MCR 302) was used to measure the shear-thinning rate of all samples. To prepare the samples for measurement of the shear-thinning rate, bitumen was mixed with glass beads (representing siliceous stone) 100 microns in diameter at a 1:2 weight ratio of glass beads to bitumen. Three specimens (0.3 g each) for each sample were prepared and cast in 8-mm silicon molds. Each specimen was subjected to a shear sweep test (0.1 to 100 l/sec). The test temperatures were selected to have similar viscosity values for all samples.

The shear-thinning value was measured as the slope of the best-fitted line in the shear-thinning region shown in FIG. 19A, where its slope is measured to be −2.18.

Computational Method: DFT calculations. Computational modeling using density functional theory was used to characterize and compare the affinity of toluene (with and without NMP) towards the asphaltenes and silica's active site. To do so, a cluster approach was used to model the silica surface. A Preliminary Periodic Boundary Condition (PBC) was applied to construct the silica cluster. In this regard, a 3×3×1 Å super cell was built from the unit cell of α-quartz with optimized parameters of a=b=4.928 Å, c=5.428 Å, α=β=90.0°, and γ=120.0°. The silica super cell was then fully optimized at the PBE-D level and with quality of "fine" grid using CASTEP modulus embedded in the Accelrys Materials Studio program package (version 7). The (001) Miller basal plane was cleaved out of the optimized 3×3×1 super cell, dangling bonds of O and Si atoms were saturated with H and OH, respectively, and the periodic condition was removed from the system. The resulting silica cluster model was used.

For all interactions, non-periodic Density Functional Theory (DFT) was used, applying the Dmol3 modulus implemented in the Accelrys Materials Studio program package (version 7). The Perdew-Burke-Ernzerhof (PBE) exchange-correlation functional with Grimme's dispersion correction (PBE-D) and all-electron double-numerical polarized basis set (DNP) was applied. Optimizations were performed considering the convergence criteria of $2.0×10^{-5}$ hartree, $4.0×10^{-3}$ hartree/Å, and $5.0×10^{-3}$ Å for energy, maximum force, and displacement, respectively. Interaction energies were evaluated by Eq. 1.

Figures 20A, 20B, 20C:
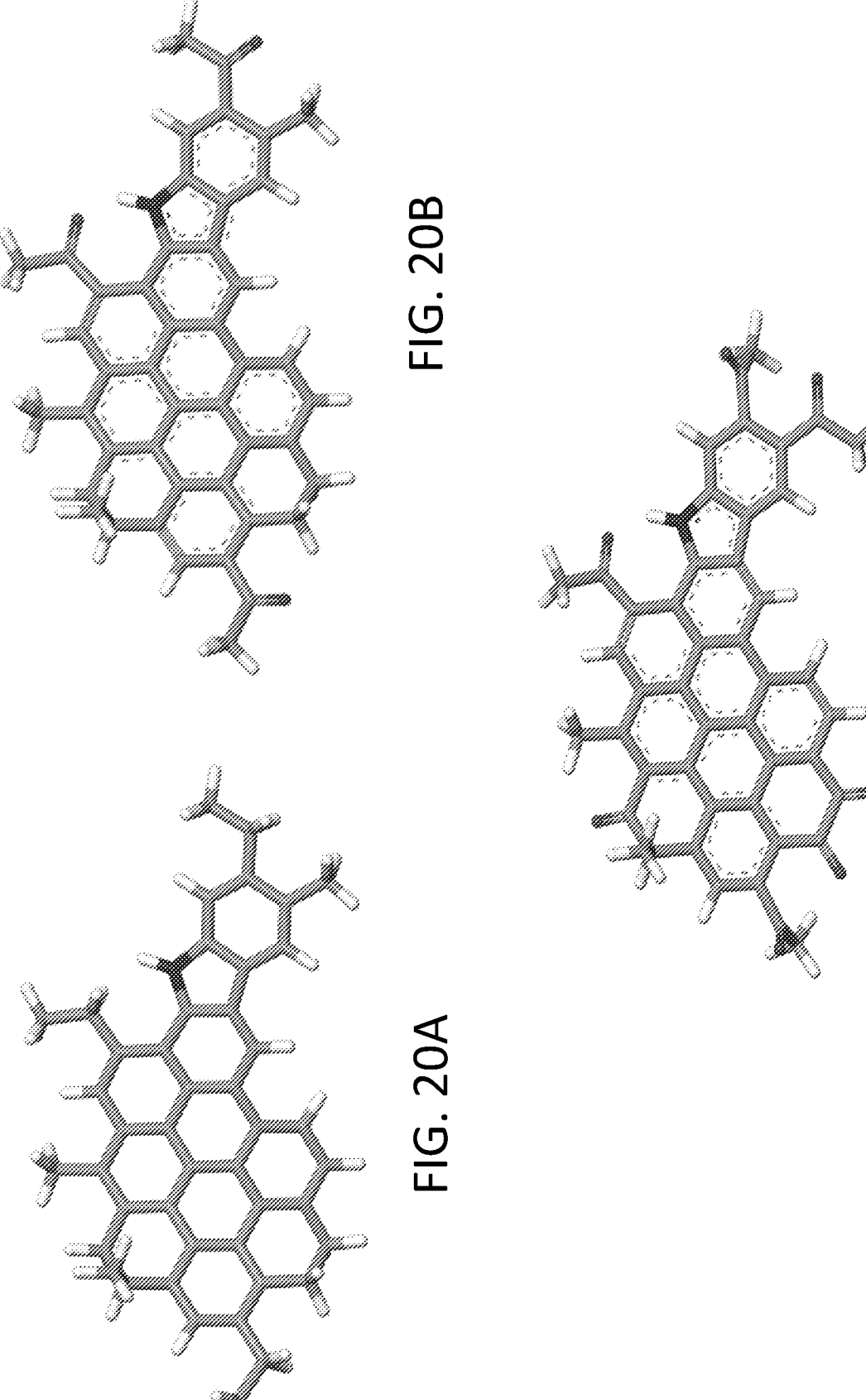
FIGS. 20A-20C show optimized geometries of unaged (U), mildly aged (M), and severely aged (S) asphaltenes, respectively.

For the above-mentioned non-periodic parameters, only the uppermost sheet of the silica cluster (including the atoms that have a chance to take part in interactions) was optimized; the remaining bottom atoms of the cluster were considered fixed to preserve the bulk-like rigidity. The Yen-Mullins island molecular model modified by Green-field-Li and Fini et al. was used to model the asphaltenes. The model is a medium-size continental-type conformer of asphaltene with a pyrrole ring in its structure. To select a proper size of asphaltene molecule to be adsorbed on the 3×3×1 silica cluster model, truncation was applied on long side chains of asphaltene, with aromatic parts and methyl group substitutions remaining intact. Unaged asphaltene (UA), mildly aged asphaltene (MA), and severely aged asphaltene (SA) were considered. Aging increases the concentration of asphaltene content and polar groups in bitumen. Ketones and sulfoxides are the main functional groups that are formed due to oxidative aging. The MA has three oxidized benzylic carbons (ketone groups) in its structure; the benzylic carbon has been reported as a major site susceptible to oxidation. SA was built by introducing more oxygen to both benzylic and aromatic carbons. The optimized geometries of UA, MA, and SA are presented in FIGS. 20A-20C, respectively. The process of aging affects the molecular structure and chemical properties of asphaltene. FIGS. 20A-20C shows that as time progresses, there is an increase in the number of oxygen atoms attached to the benzene rings and other vulnerable spots as the asphaltene ages progresses from UA (FIG. 20A) to SA (FIG. 20C).

MD simulations. Dimensions of the periodic cell of oil molecules were set to 30×30×30 Å; those of the periodic cell of both silica models with the names of silica-oxygen and silica-hydroxyl were 30×30×20 Å as depicted in FIGS. 21A-21F. In the final designed cell, asphaltene was located at 3 Å above the silica surface while it was prevented from electronic interaction at this stage. To relax the interaction system of silica and asphaltene, it was allowed to interact for 300 ps with a constant-volume and a constant-temperature (NVT) ensemble. Dimensions of the silica-asphaltene-oil-droplet cell in the x, y, and z directions were 30×30×60 Å, respectively. A vacuum space with 60 Å heights in the Z direction was added, so the final dimension of the silica-asphaltene-oil-droplet cell in the z direction was 120 Å.

The COMPASS force field was used to model the interatomic interactions between the asphaltene molecules, the silica-oxygen, the silica-hydroxyl, and the oil droplet. The designed system reaches an equilibrium state at its lowest energy level. Optimizing the structure of the nanostructures and minimizing the energy level were achieved using the SMART method, which is a combination of the steepest descent, conjugate gradient, and Newton-Raphson methods. For the system to reach dynamic equilibrium, a total analysis time of up to 1000 ps with a NVT ensemble was used. This process was designed to resemble the surface interaction and reacting process at the 298 K level, where a Nose thermostat was set to control the temperature. The interaction energy was calculated using Eq. 1.

To calculate MSD, 5 different starting points by a random algorithm that is embedded in the amorphous module in the Material Studio software were used. Three models were created: (i) oxidized asphaltene on a silicate substrate, (ii) oxidized asphaltene surrounded by toluene molecules on a silicate substrate (iii) oxidized asphaltene surrounded by toluene and NMP molecules on a silicate substrate. The simulation models were ran for 4500 picoseconds, and the starting points for the MSD values were the 500 ps mark when the system became stable in energy and temperature.

FIGS. 21A-21D show the atomic structure of the bio-oil droplet (toluene and NMP) in the singular molecule and amorphous supercell, and FIG. 21E shows the silica models with the surface of oxygen atoms and the surface of hydroxyl groups. These models accurately reproduce the silica's surface, which can include either the negative or the partially negative charge.

Toluene and 1-methyl-2-pyrrolidone (NMP) shown in FIG. 21A were used as molecular models for solvents in this analysis. FIGS. 21B and 21C show the calculated toluene and toluene-NMP solvent cells, respectively. The solvent was then used in the solvent-asphaltene-silica trinary to measure the adhesiveness between silica and asphaltene. FIG. 21D also shows a cell of molecules that form asphalt binder. The aging process causes a decrease in the lighter components of asphalt binder while causing considerable chemical changes to its structure. To preserve the consistency of the simulations, the model of asphalt binder was limited to asphaltene-pyrrole, which is present in both the unaged and aged asphalt binder. This way, the overall trends of changes like oxidation can be generalized in a series of tests conducted with one species, keeping the effective parameters in check and adding to the overall accuracy of the simulation. Silica was also modeled using two different approaches: the surface of one is covered with —OH; the other's surface is covered with —O. To take this difference into consideration, both models of silica were used in the simulations.

Figures 22A, 22B, 22C:
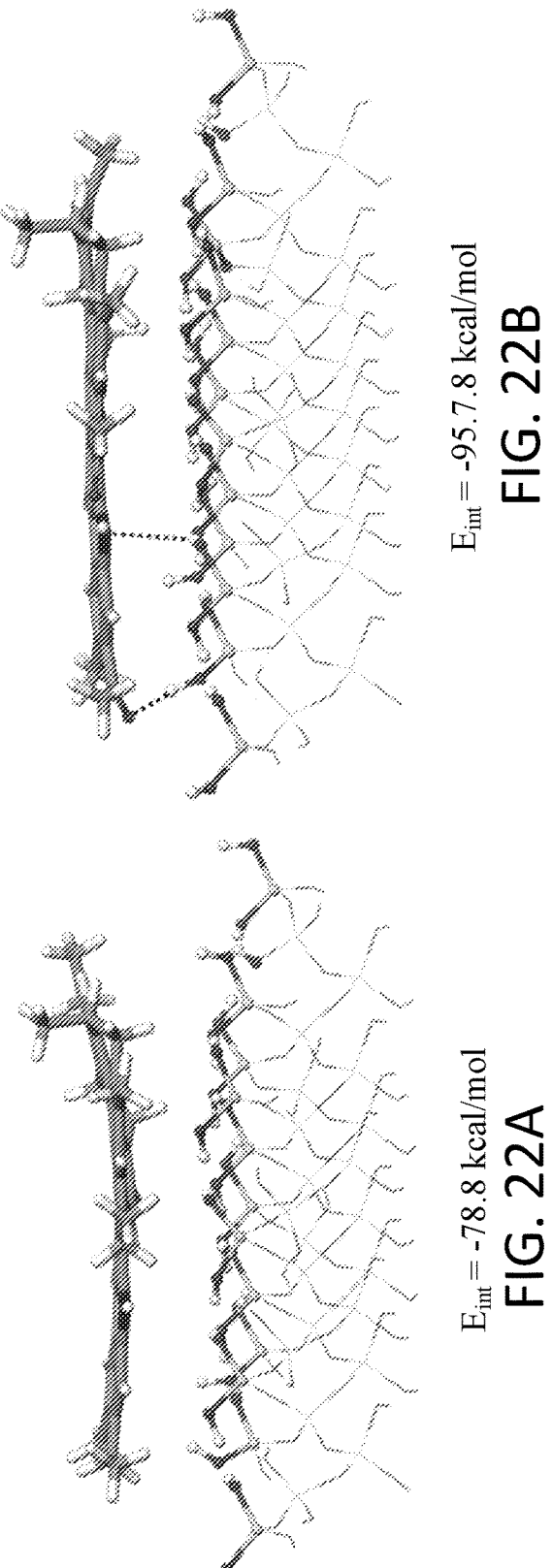
FIGS. 22A-22C depict the most stable interactions of silica cluster model with unaged (U), mildly aged (M), and severely aged (S) asphaltenes, respectively. Hydrogen bonds are shown with dashes.
Figures 23A, 23B:
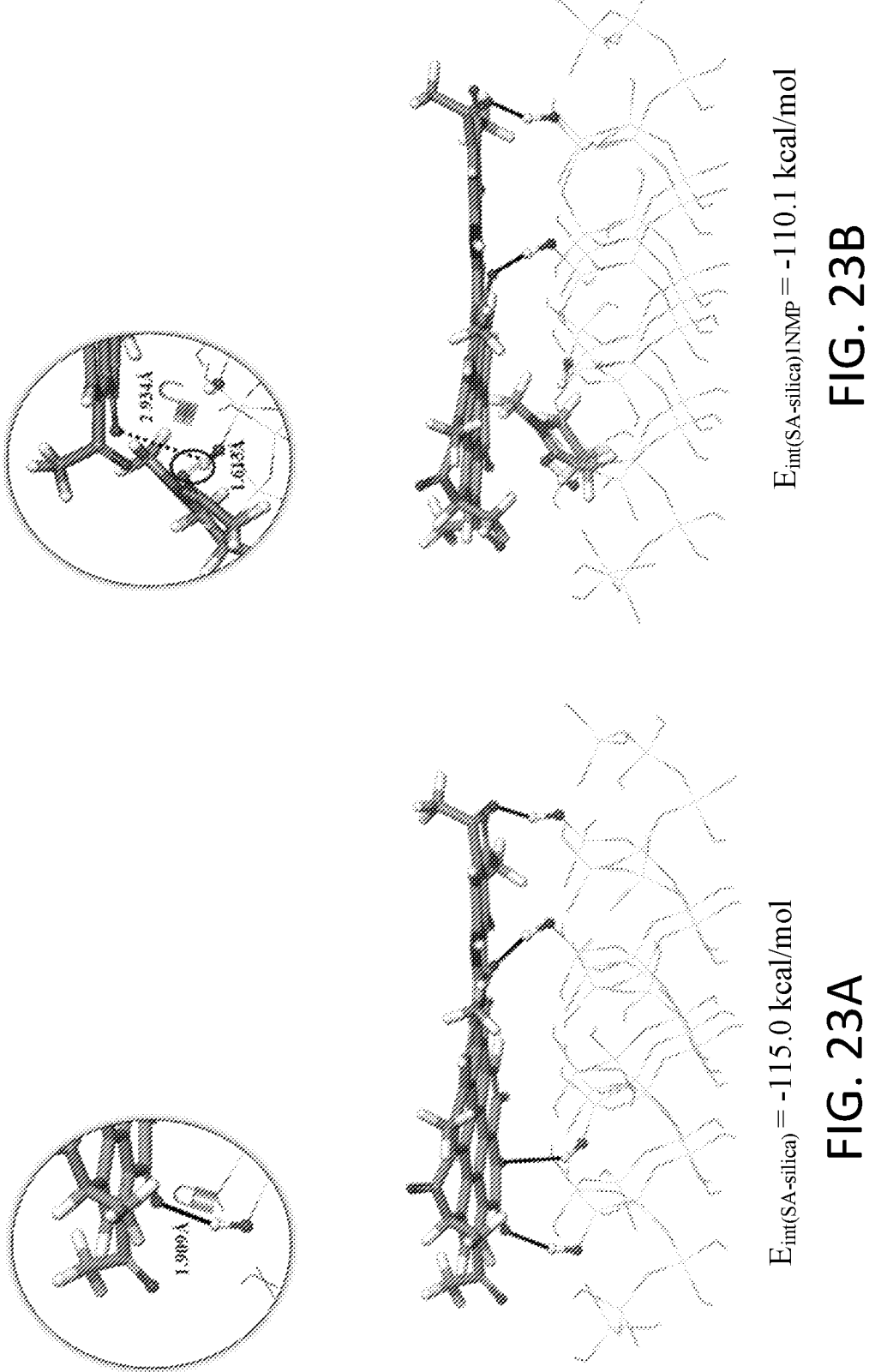
FIGS. 23A-23E show severely aged asphaltene interacting with silica in the presence of 0, 1, 2, 3, and 4 molecules of NMP, respectively. For clarity, only the OH groups of silica that were involved in hydrogen bonding have been represented in ball and stick.
Figures 23C, 23D, 23E:
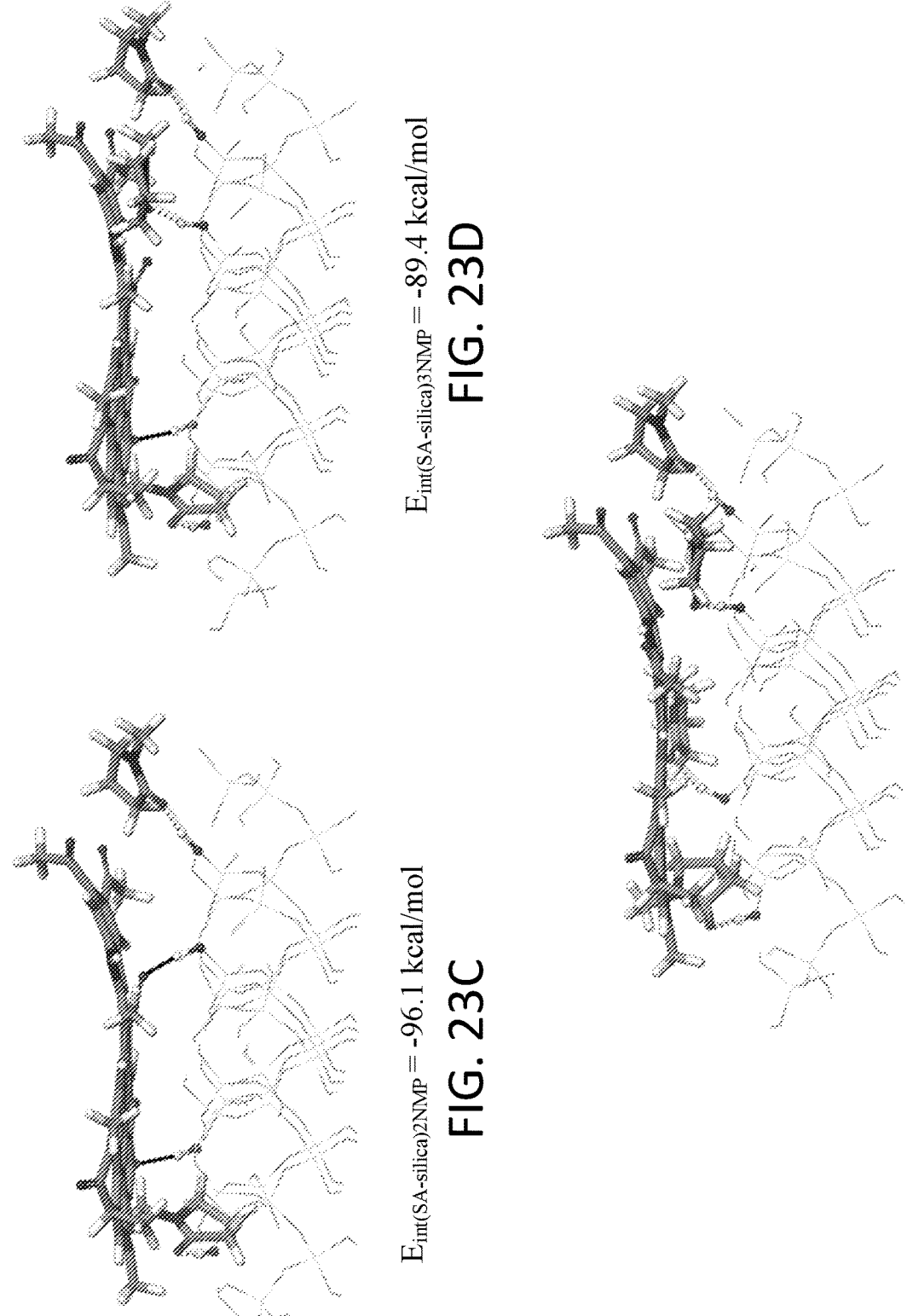

FIGS. 22A-22C depict the most stable interactions of silica cluster model with unaged (U), mildly aged (M), and severely aged (S) asphaltenes, respectively. Hydrogen bonds are shown with dashes. Interactions between asphaltene and silica (—OH) are highly dependent on the extent of aging. Before aging as shown in FIG. 22A, the lack of oxygen-containing functional groups on the UA molecule prevents it from strongly interacting with silica, and the interactions remain at the vdW level. As the asphalt binder (here modeled with asphaltene) ages as shown in FIGS. 22B and 22C for MA and SA, respectively, oxygen-containing groups adhere to the asphaltene's surface. The high polarity of these atoms allows for stronger hydrogen bonds between the surfaces of asphaltene and silica, increasing the bonding energy between the two surfaces; the bonding energy for the aged model is 60% higher than the unaged model.

FIGS. 23A-23E show the cumulative effects of severely aged asphaltene interacting with silica in the presence of 0, 1, 2, 3, and 4 molecules of NMP, respectively. For clarity, only the OH groups of silica that were involved in hydrogen bonding have been represented in ball and stick. While interlocked, the interaction between silica and asphaltene consists of hydrogen bonds at 1.909 Å shown in FIG. 23A. The inclusion of NMP blocks the adsorptive spots on the silica surface, one by one, as depicted in FIGS. 23B-23E. This correlates with decreasing interaction energy between aged asphaltene and silica, dropping by ~30% after adding 4 NMP molecules depicted in FIG. 23E. This is a mechanism by which the asphaltene-silica bond is unlocked and becomes vulnerable to mechanical and/or hydraulic pressure to detach.

Figure 24A:
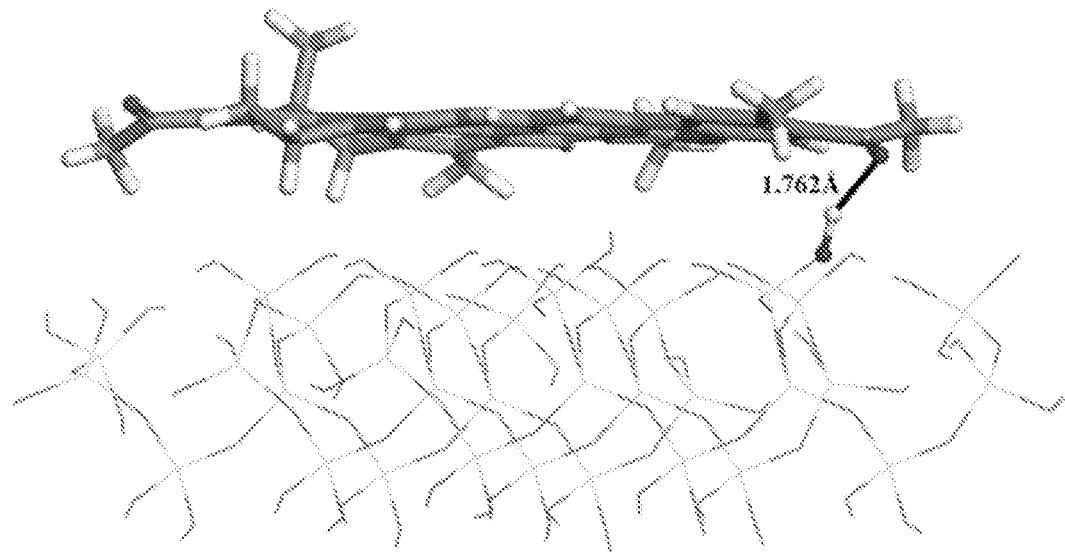
FIGS. 24A and 24B show mildly aged asphaltene interacting with silica in the presence of 0 and 1 molecule of NMP, respectively. For clarity, only the OH group of silica that was involved in hydrogen bonding has been represented in ball and stick.
Figure 24B:
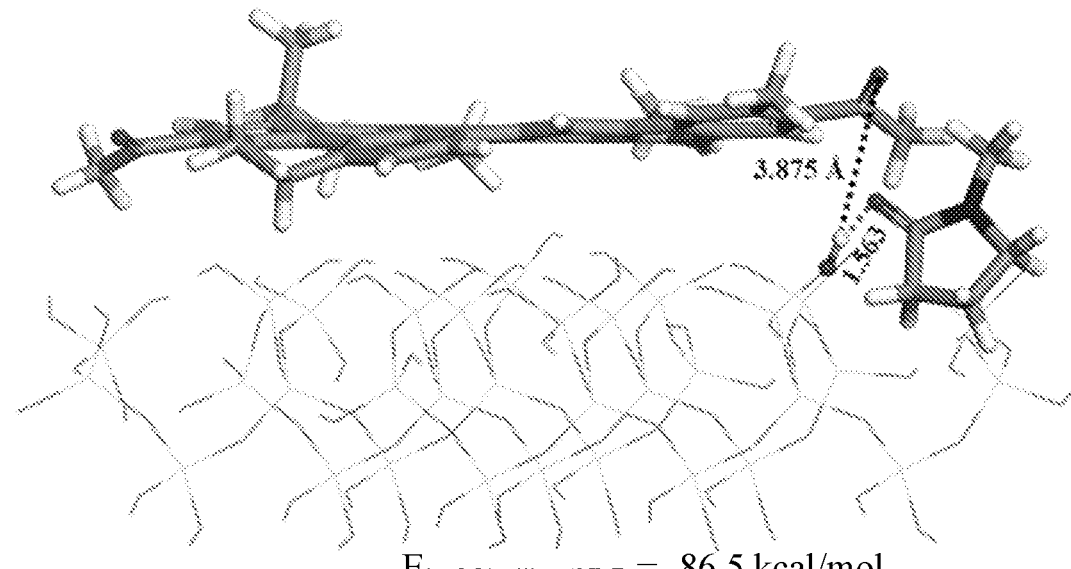

FIGS. 24A and 24B show the interactions between mildly aged asphaltene and silica with and without an NMP molecule, respectively. With no molecule present between silica and asphaltene, the O(asphaltene)-H(silica) distance is about 1.762 Å as shown in FIG. 24A. When NMP permeates the space between asphaltene and silica, this distance increases to 3.875 Å as shown in FIG. 24B. This increase of nearly 100% greatly reduces the absorption tendencies between asphaltene and silica. The O(asphaltene)-H(silica) is replaced with another pair: O(NMP)-H(silica). This substitution reduces the asphaltene-silica interaction energy by nearly 10%.

Weakening the asphaltene-silica interaction facilitates other mechanisms such as slide and slip of asphaltenes on the silica surface. The diffusion of more NMP and toluene into the asphaltene-silica space leads to hybrid solvent displacing asphaltene on silica, followed by dissolving separated asphaltene deposits. Hence, NMP promotes asphaltene desorption from silica through two mechanisms: 1) a synergistic effect of NMP and toluene to dissolve the adsorbed asphaltenes, especially for unaged asphaltene; and 2) a competition with asphaltenes for adsorbing to silica's active sites.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of treating aged asphalt, the method comprising:
   contacting aged asphalt with a bioagent to yield a mixture, wherein the aged asphalt comprises a siliceous stone component and bitumen, and the bioagent comprises bio-oils formed from swine manure and algae; and
   separating the siliceous stone component from the bitumen to yield a recovered bitumen,
   wherein the bioagent promotes separation of the siliceous stone component from the bitumen.

2. The method of claim 1, wherein the bioagent peptizes the recovered bitumen.

3. The method of claim 1, further comprising combining the recovered bitumen with additional bitumen to yield a mixed bitumen.

4. The method of claim 3, further comprising combining the mixed bitumen with aggregate to yield asphalt.

5. The method of claim 3, wherein the bioagent forms a hydrophobic bridge between the siliceous stone component and the bitumen, thereby enhancing water-damage resistance of the mixed bitumen.

6. The method of claim 1, wherein the bioagent comprises one or more of p-cresol, phenol, N-methyl-2-pyrrolidone, 1-methyl-9H-pyrido[3,4-b] indole, N-methyl-myristamide, nonadecanamide, 1-butyl-piperidine, and mesitonitrile.

7. The method of claim 1, wherein the bioagent comprises specific functional groups comprising polar oxygen and nitrogen heteroatoms.

8. The method of claim 1, wherein the bioagent is produced from a mixture comprising about 10 wt % to about 30 wt % of the swine manure and about 70 wt % to about 90 wt % of the algae.

9. The method of claim 1, wherein the mixture comprises about 5 wt % to about 15 wt % of the bioagent and about 85 wt % to about 95 wt % of the aged asphalt.

10. The method of claim 1, wherein separating the siliceous stone component from the bitumen comprises washing the bitumen from a surface of the siliceous stone component.

11. The method of claim 1, wherein the bioagent comprises one or more of phenol compounds, heterocyclic compounds, aliphatic compounds comprising oxygen and nitrogen, aromatic compounds comprising nitrogen, and fused aromatic compounds comprising nitrogen.

12. The method of claim 1, further comprising forming the bioagent by hydrothermal liquefaction of the swine manure and the algae.

13. The method of claim 1, wherein the bio-oils comprise waste cooking oil.

* * * * *